United States Patent
Takeuchi et al.

[11] Patent Number: 6,028,978
[45] Date of Patent: *Feb. 22, 2000

[54] DISPLAY DEVICE HAVING A COLORED LAYER DISPOSED BETWEEN A DISPLACEMENT TRANSMITTING SECTION AND AN OPTICAL WAVEGUIDE PLATE

[75] Inventors: Yukihisa Takeuchi, Nishikamo-gun; Tsutomu Nanataki, Toyoake; Hisanori Yamamoto, Nagoya, all of Japan

[73] Assignee: NGK Insulators, Ltd., Nagoya, Japan

[*] Notice: This patent is subject to a terminal disclaimer.

[21] Appl. No.: 08/991,021

[22] Filed: Dec. 15, 1997

[30] Foreign Application Priority Data

Dec. 16, 1996 [JP] Japan .................................. 8-335876
Mar. 14, 1997 [JP] Japan .................................. 9-060667
Nov. 6, 1997 [JP] Japan .................................. 9-304625

[51] Int. Cl.$^7$ .................................................. G09G 3/34
[52] U.S. Cl. ............................. 385/147; 310/331; 345/48; 345/85; 345/108; 359/222; 359/295; 385/19; 385/31; 385/901
[58] Field of Search .................................. 385/8, 14, 19, 385/129, 131, 147, 901, 31; 359/196, 222, 223, 224, 291, 295; 310/324, 327, 328, 330, 331, 348, 358; 345/30, 48, 84, 85, 108

[56] References Cited

U.S. PATENT DOCUMENTS

| | | | |
|---|---|---|---|
| 4,113,360 | 9/1978 | Baur et al. | 345/84 |
| 5,052,777 | 10/1991 | Ninnis et al. | 385/19 |
| 5,078,475 | 1/1992 | Sekimura et al. | 359/68 |
| 5,430,344 | 7/1995 | Takeuchi et al. | 310/330 |
| 5,600,197 | 2/1997 | Takeuchi et al. | 310/328 |
| 5,613,022 | 3/1997 | Odhner et al. | 385/147 X |
| 5,636,072 | 6/1997 | Shibata et al. | 359/896 |
| 5,654,779 | 8/1997 | Nakayama et al. | 385/901 X |
| 5,771,321 | 6/1998 | Stern | 385/901 X |
| 5,862,275 | 1/1999 | Takeuchi et al. | 385/19 |

FOREIGN PATENT DOCUMENTS 0 675 477 A1  3/1995  European Pat. Off. .
07287176  10/1995  Japan .

OTHER PUBLICATIONS

Patent Abstracts Of Japan vol. 010, No. 241 (P–488), Aug. 20, 1986 & JP 61 070501 A (Matsushita Electric Ind Co Ltd), Apr. 11, 1986.

Primary Examiner—John D. Lee
Attorney, Agent, or Firm—Wall Marjama Bilinski & Burr

[57] ABSTRACT

Disclosed is a display device comprising an optical waveguide plate for introducing light thereinto, and a driving section provided opposingly to the back surface of the optical waveguide plate and including a number of actuator elements arranged corresponding to a large number of picture elements, for displaying, on the optical waveguide plate, a picture image corresponding to an image signal by controlling leakage light at a predetermined portion of the optical waveguide plate by controlling displacement action of each of the actuator elements in a direction to make contact or separation with respect to the optical waveguide plate in accordance with an attribute of the image signal to be inputted; the display device further comprising a displacement-transmitting section for transmitting the displacement action of the actuator element to the optical waveguide plate, wherein a plate member of the displacement-transmitting section is constructed by a white scattering element, and a color filter is formed at a position corresponding to each of the actuator elements, on the back surface of the optical waveguide plate.

19 Claims, 20 Drawing Sheets

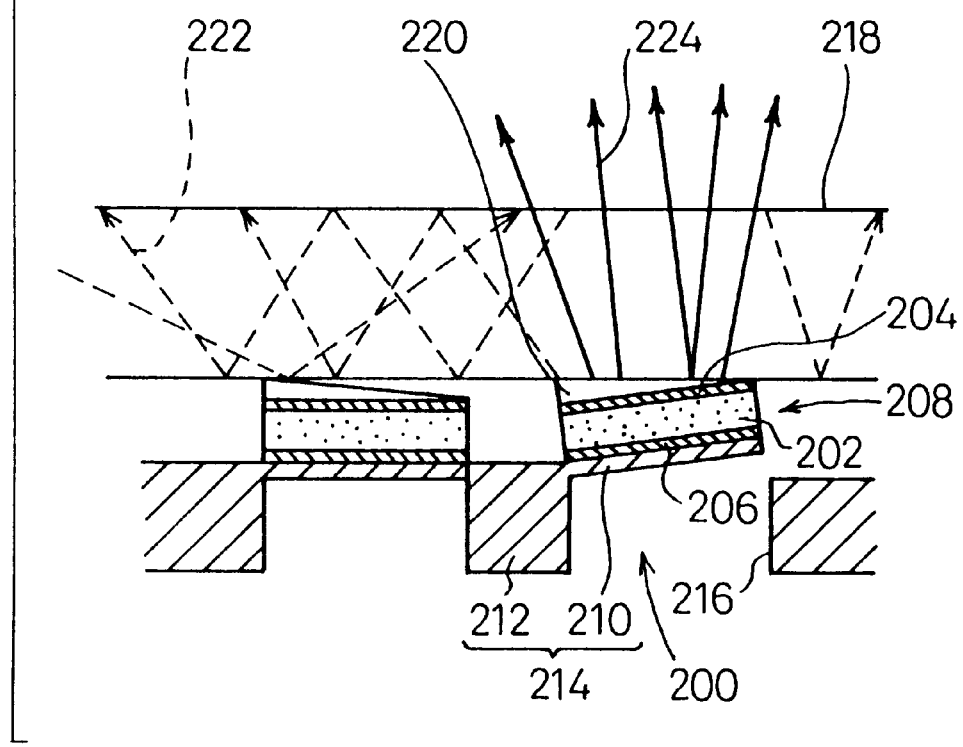

DISPLAY DEVICE HAVING A COLORED LAYER DISPOSED BETWEEN A DISPLACEMENT TRANSMITTING SECTION AND AN OPTICAL WAVEGUIDE PLATE

BACKGROUND OF THE INVENTION

1. Field of the Invention

The present invention relates to a display device which consumes less electric power, and which has high screen brightness. In particular, the present invention relates to an improvement of a display device for displaying a picture image corresponding to an image signal on an optical waveguide plate by controlling leakage light at a predetermined position on the optical waveguide plate by controlling the displacement action of an actuator element in a direction to make contact or separation with respect to the optical waveguide plate in accordance with the attribute of the image signal to be inputted.

2. Description of the Related Art

Known display devices include, for example, cathode ray tubes (CRT) and liquid crystal display devices.

Cathode ray tubes include, for example, ordinary television receivers and monitor units for computers. Although the cathode ray tube has a bright screen, it consumes a large amount of electric power. Further, the cathode ray tube involves a problem that the depth of the entire display device is large compared with the size of the screen.

On the other hand, the liquid crystal display device is advantageous in that the entire device can be miniaturized, and the display device consumes a small amount of electric power. However, the liquid crystal display device is inferior in brightness of the screen, and the field angle of the screen is narrow.

In the case of the cathode ray tube and the liquid crystal display device, it is necessary for a color screen to use a number of picture elements (image pixels) which is three times a number of picture elements used in a black-and-white screen. For this reason, the device itself is complicated, a great deal of electric power is consumed, thereby inevitably resulting in increased cost.

In order to solve the problems described above, the present applicant has suggested a novel display device (see, for example, Japanese Laid-Open Patent Publication No. 7-287176). As shown in FIG. 20, this display device includes actuator elements 200 arranged for respective picture elements. Each of the actuator elements 200 comprises a main actuator element 208 including a piezoelectric/electrostrictive layer 202 and an upper electrode 204 and a lower electrode 206 formed on upper and lower surfaces of the piezoelectric/electrostrictive layer 202 respectively, and a substrate 214 including a vibrating section 210 and a fixed section 212 disposed under the main actuator element 208. The lower electrode 206 of the main actuator element 208 contacts with the vibrating section 210. The main actuator element 208 is supported by the vibrating section 210.

The substrate 214 is composed of a ceramic in which the vibrating section 210 and the fixed section 212 are integrated into one unit. A recess 216 is formed in the substrate 214 so that the vibrating section 210 is thin-walled.

A displacement-transmitting section 220 for obtaining a predetermined contact area with an optical waveguide plate 218 is connected with the upper electrode 204 of the main actuator element 208. In the illustrative display device shown in FIG. 20, the displacement-transmitting section 220 is arranged such that it is located closely near to the optical waveguide plate 218 in the OFF selection state or in the NO selection state in which the actuator element 200 stands still, while it contacts with the optical waveguide plate 218 in the ON selection state at a distance of not more than the wavelength of the light.

The light 222 is introduced, for example, from a lateral end of the optical waveguide plate 218. In this arrangement, all of the light 222 is totally reflected at the inside of the optical waveguide plate 218 without being transmitted through front and back surfaces thereof by controlling the magnitude of the refractive index of the optical waveguide plate 218. In this state, a voltage signal corresponding to an attribute of an image signal is selectively applied to the actuator element 200 by the aid of the upper electrode 204 and the lower electrode 206 so that the actuator element 200 is allowed to perform various displacement actions of ON selection, OFF selection, and NO selection. Thus, the displacement-transmitting section 220 is controlled for its contact and separation with respect to the optical waveguide plate 218. Accordingly, the scattered light (leakage light) 224 is controlled at a predetermined portion of the optical waveguide plate 218, and a picture image corresponding to the image signal is displayed on the optical waveguide plate 218.

When a color picture is displayed by using the display device, the following operation is performed. For example, light sources for three primary colors are switched to control the light emission time for three primary colors, while synchronizing the contact time between the optical waveguide plate and the displacement-transmitting plate with the period of color development. Alternatively, the contact time between the optical waveguide plate and the displacement-transmitting plate is controlled, while synchronizing the light emission time for three primary colors with the color development period.

Therefore, the illustrative display device suggested by the present applicant is advantageous in that it is unnecessary to increase the number of picture elements as compared with the black-and-white screen, even when the display device is applied to the color display system.

However, in the case of the illustrative display device suggested by the present applicant, it is necessary to display three images in total, i.e., an image for R, an image for G, and an image for B, within a prescribed one field period. Therefore, the horizontal frequency should be made extremely quick.

For this reason, a problem arises in that the electric power consumption is increased, and the peak current is also increased. Further, an inconvenience occurs in that the cost becomes highly expensive, because it is required to use an actuator element having a quick response speed, and the driving circuit arrangement is also complicated.

SUMMARY OF THE INVENTION

The present invention has been made taking the foregoing problems into consideration, an object of which is to provide a display device which makes it unnecessary to switch light sources, which can deal with the use of an actuator element having a slow response speed, and which makes it possible to obtain high brightness and reduce production cost and electric power consumption.

According to the present invention, there is provided a display device comprising an optical waveguide plate for introducing light thereinto, and a driving section provided opposingly to one plate surface of the optical waveguide plate and including a number of actuator elements arranged corresponding to a large number of picture elements, for displaying, on the optical waveguide plate, a picture image corresponding to an image signal by controlling leakage light at a predetermined portion of the optical waveguide plate. This is achieved by controlling displacement action of each of the actuator elements in a direction to make contact or separation with respect to the optical waveguide plate in accordance with an attribute of the image signal to be inputted. The display device further comprises a displacement-transmitting section for transmitting the displacement action of the actuator element to the optical waveguide plate, and a colored layer disposed between the displacement-transmitting section and the optical waveguide plate.

According to the present invention, all of the light, which is introduced, for example, from a lateral end of the optical waveguide plate, is totally reflected at the inside of the optical waveguide plate without being transmitted through front and back surfaces thereof by controlling the magnitude of the refractive index of the optical waveguide plate. In this state, when the displacement-transmitting section approaches the optical waveguide plate in accordance with the displacement action of the actuator section, the light, which has been subjected to total reflection, is transmitted through the colored layer and it is scattered by the displacement-transmitting section, or it is scattered by the colored layer and it behaves as scattered light. A part of the scattered light is reflected again in the optical waveguide plate. However, almost all of the scattered light is transmitted through the front surface of the optical waveguide plate without being reflected by the optical waveguide plate.

As described above, the presence or absence of light emission (leakage light) at the front surface of the optical waveguide plate can be controlled in accordance with approach and separation of the displacement-transmitting plate disposed at the back of the optical waveguide plate, with respect to the optical waveguide plate. In this system, for example, one unit for allowing the displacement-transmitting section to make displacement action in the direction to perform approach or separation with respect to the optical waveguide plate may be regarded as one picture element. A picture image (for example, characters and graphics) corresponding to the image signal can be displayed on the front surface of the optical waveguide plate in the same manner as the cathode ray tube and the liquid crystal display device, by arranging a large number of the picture elements in a matrix form, and controlling the displacement action of each of the picture elements in accordance with the attribute of the inputted image signal.

When the display device of the present invention is applied to the color display system, the following arrangement may be adopted, for example, in relation to the color scheme of the colored layers (for example, three primary color filters, complementary color filters, or colored scattering elements) disposed between the optical waveguide plate and the displacement-transmitting section. That is, for example, one picture element may be constructed by three actuator elements adjacent to one another (RGB arrangement) or by four actuator elements adjacent to one another (checked arrangement). The colored scattering element herein indicates an element which is opaque and which is obtained, for example, by dispersing a coloring matter such as a pigment in a resin.

As described above, in the display device according to the present invention, the scattered light can be colored by using the colored layer even when the light source is not switched. Accordingly, it is unnecessary to display a plurality of images within a prescribed one field period, and it is possible to provide enough time for the driving timing. Accordingly, the display device can sufficiently deal with the use of an actuator element having a slow response speed. Further, it is possible to obtain high brightness and reduce production cost and electric power consumption.

Further, the colored layer for coloring the scattered light, and the displacement-transmitting section or the colored layer for scattering the light are arranged at the neighboring positions, the adjacent positions, or the identical position. Therefore, the display device according to the present invention is advantageous in that the field angle of the screen can be made wide. The spacing distance therebetween is preferably not more than 100 $\mu$m, and more preferably not more than 50 $\mu$m.

It is desirable for the display device constructed as described above that the actuator element comprises an operating section including a shape-retaining layer and at least a pair of electrodes formed on the shape-retaining layer, a vibrating section for supporting the operating section, and a fixed section for supporting the vibrating section in a vibrating manner. The actuator section having the shape-retaining layer herein indicates an actuator element which has at least two or more displacement states at an identical voltage level. The actuator element having the shape-retaining layer has the following features.

(1) The threshold characteristic concerning the change from the OFF state to the ON state is steep as compared with the case in which no shape-retaining layer exists. Accordingly, it is possible to narrow the deflection width of the voltage, and it is possible to mitigate the load on the circuit.

(2) The difference between the ON state and the OFF state is distinct, resulting in improvement in contrast.

(3) The dispersion of threshold value is decreased, and enough margin is provided for the voltage setting range. It is desirable to use, as the actuator element, an actuator element which makes, for example, upward displacement (giving the separated state upon no voltage load and giving the contact state upon voltage application) because of easiness of control. Especially, it is desirable to use an actuator element having a structure including a pair of electrodes on its surface.

(4) It is preferable to use, for example, a piezoelectric/electrostrictive layer and an anti-ferroelectric layer as the shape-retaining layer.

In a first illustrative arrangement, the colored layer is formed at a position corresponding to the actuator element, on a surface of the optical waveguide plate opposing to the driving section. It is also preferable that a transparent layer intervenes between the displacement-transmitting section and the colored layer. In this arrangement, it is preferable that an end surface of the transparent layer is displaced in a direction to make contact or separation with respect to the colored layer in accordance with the displacement action of the actuator element. Alternatively, it is also preferable that an end surface of the displacement-transmitting section is displaced in a direction to make contact or separation with respect to an end surface of the transparent layer in accordance with the displacement action of the actuator element.

In a second illustrative arrangement, the colored layer is formed at a position corresponding to the actuator element, on an end surface of the displacement-transmitting section. In this arrangement, it is preferable that a second displacement-transmitting section is disposed on the surface including the colored layer.

In a third illustrative arrangement, a part of the displacement-transmitting section is also used as the colored layer. In this arrangement, it is also preferable that a transparent layer intervenes between the optical waveguide plate and the colored layer.

In a modified embodiment of the third illustrative arrangement, a second displacement-transmitting section may be disposed on the surface including the displacement-transmitting section which is also used as the colored layer. Alternatively, a second colored layer may be formed at a position corresponding to the actuator element, on the surface of the optical waveguide plate opposing to the driving section. Further alternatively, a second colored layer may be formed at a position corresponding to the actuator section, on an end surface of the displacement-transmitting section which is also used as the colored layer.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 20 shows an illustrative arrangement of a display device hitherto suggested by the present applicant.

DESCRIPTION OF THE PREFERRED EMBODIMENTS

Several illustrative embodiments of the display device according to the present invention will be described below with reference to FIGS. 1 to 19.

Figure 1:
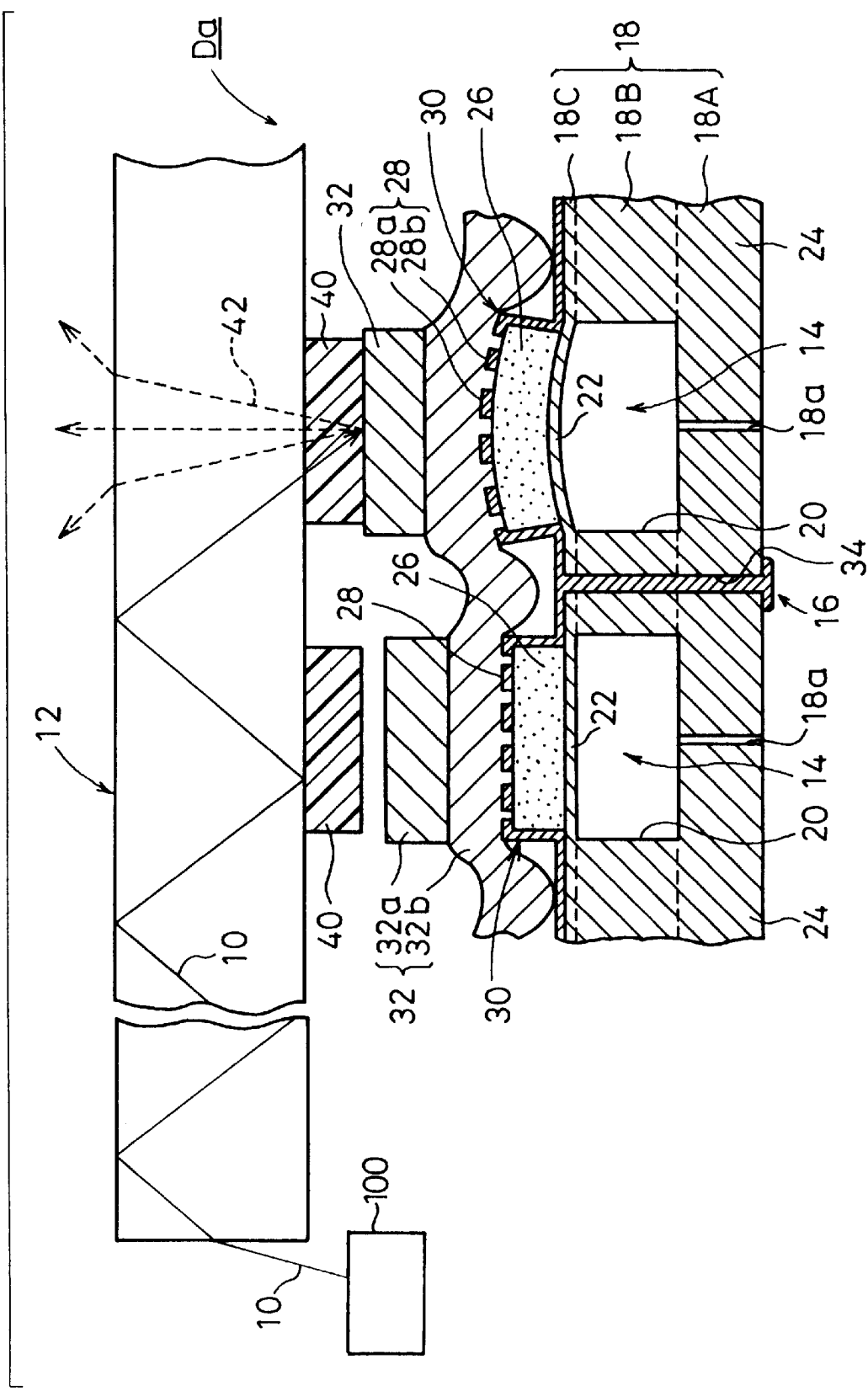
FIG. 1 shows a cross-sectional arrangement illustrating a display device according to the first embodiment.
Figure 2:
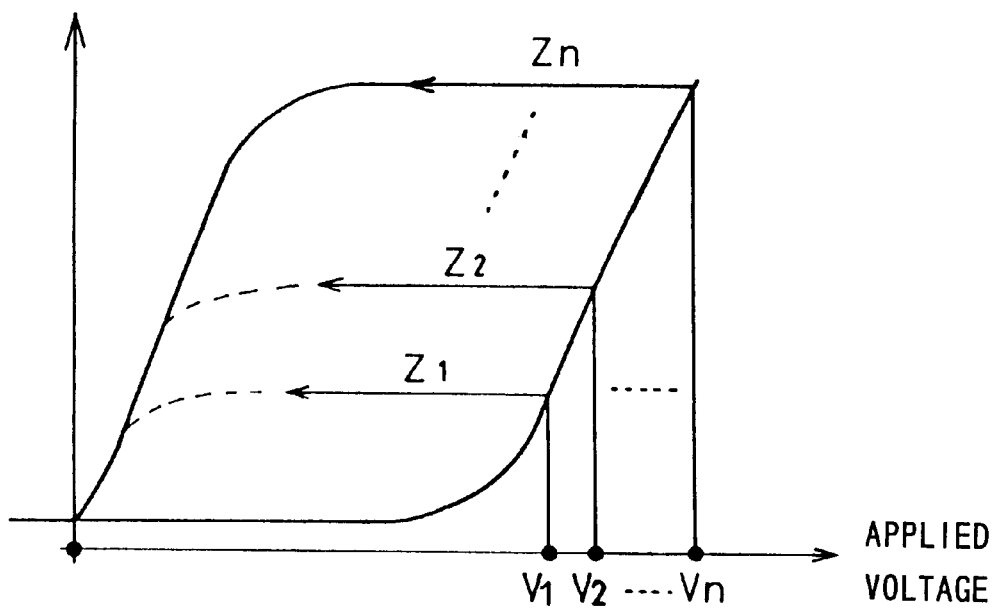
FIG. 2 shows displacement characteristic curves of an actuator element illustrating gradation control based on the voltage modulation system.

As shown in FIG. 1, a display device Da according to the first embodiment comprises an optical waveguide plate 12 for introducing light 10 from a light source 100 thereinto, and a driving section 16 provided opposingly to the back surface of the optical waveguide plate 12 and including a large number of actuator elements 14 which are arranged corresponding to picture elements (image pixels).

The driving section 16 includes a substrate 18 composed of, for example, a ceramic. The actuator elements 14 are arranged at positions corresponding to the respective picture elements on the substrate 18. The substrate 18 has its first principal surface which is arranged to oppose to the back surface of the optical waveguide plate 12. The first principal surface is a continuous surface (flushed surface). Hollow spaces 20 for forming respective vibrating sections as described herein are provided at positions corresponding to the respective picture elements at the inside of the substrate 18. The respective hollow spaces 20 communicate with the outside via through holes 18a each having a small diameter and provided at a second principal surface of the substrate 18.

The portion of the substrate 18, at which the hollow space 20 is formed, is thin-walled. The other portion of the substrate 18 is thick-walled. The thin-walled portion has a structure which tends to undergo vibration in response to external stress, and it functions as a vibrating section 22. The portion other than the hollow space 20 is thick-walled, and it functions as a fixed section 24 for supporting the vibrating section 22.

That is, the substrate 18 has a stacked structure comprising a substrate layer 18A as a lowermost layer, a spacer layer 18B as an intermediate layer, and a thin plate layer 18C as an uppermost layer. The substrate 18 can be recognized as an integrated structure including the hollow spaces 20 formed at the positions in the spacer layer 18B corresponding to the picture elements. The substrate layer 18A functions as a substrate for reinforcement, as well as it functions as a substrate for wiring. The substrate 18 may be sintered in an integrated manner, or it may be additionally attached.

As shown in FIG. 1, each of the actuator elements 14 comprises the vibrating section 22 and the fixed section 24 described above, as well as a main actuator element 30 including a shape-retaining layer 26 composed of, for example, a piezoelectric/electrostrictive layer or an anti-ferroelectric layer directly formed on the vibrating section 22 and a pair of electrodes 28 (a row electrode 28a and a column electrode 28b) formed on an upper surface of the shape-retaining layer 26, and a displacement-transmitting section 32 connected onto the main actuator element 30, for increasing the contact area with respect to the optical waveguide plate 12 to obtain an area corresponding to the picture element.

That is, the display device Da has the structure in which the main actuator elements 30 comprising the shape-retaining layers 26 and the pairs of electrodes 28 are formed on the substrate 18. The pair of electrodes 28 may have a structure in which they are formed on upper and lower sides of the shape-retaining layer 26, or they are formed on only one side of the shape-retaining layer 26. However, in order to advantageously joint the substrate 18 and the shape-retaining layer 26, it is preferable that the pair of electrodes 28 are formed only on the upper side (the side opposite to the substrate 18) of the shape-retaining layer 26 so that the substrate 18 directly contacts with the shape-retaining layer 26 without any difference in height, as in the display device Da. In the illustrative arrangement shown in FIG. 1, for example, the row electrode 28a is led to the back surface side of the substrate through the through hole 34.

The displacement-transmitting section 32 includes a plate member 32a for defining a substantial light emission area, and a displacement-transmitting member 32b for transmitting the displacement of the main actuator element 30 to the plate member 32a.

In the display device Da according to the first embodiment, the plate member 32a of the displacement-transmitting section 32 is composed of a white scattering element. A color filter 40 is formed at a position corresponding to each of the actuator elements 14, on the back surface of the optical waveguide plate 12.

Next, the operation of the display device Da according to the first embodiment constructed as described above will be briefly described with reference to FIG. 1. At first, the light 10 is introduced, for example, from the end portion of the optical waveguide plate 12. In this embodiment, all of the light 10 is totally reflected at the inside of the optical waveguide plate 12 without being transmitted through the front and back surfaces thereof by controlling the magnitude of the refractive index of the optical waveguide plate 12. In this embodiment, the optical waveguide plate 12 desirably has a reflection factor n of 1.3 to 1.8, and more desirably 1.4 to 1.7.

In this state, when a certain actuator element 14 is in the selected state, the actuator element 14 makes bending displacement so that it is convex toward the optical waveguide plate 12, i.e., the actuator element 14 makes bending displacement in the first direction, and the end surface of the plate member 32a of the displacement-transmitting section 32 contacts, at a distance of not more than the wavelength of light, with the end surface of the color filter 40 corresponding to the actuator element 14, then the light 10, which has been subjected to total reflection, is transmitted to the surface of the displacement-transmitting section 32 through the color filter 40.

Once the light 10 arrives at the surface of the displacement-transmitting section 32, the light 10 is reflected by the surface of the displacement-transmitting section 32, and it behaves as scattered light 42. A part of the scattered light 42 is reflected again in the optical waveguide plate 12. However, almost all of the scattered light 42 is not reflected by the optical waveguide plate 12, and it is transmitted through the front surface (face) of the optical waveguide plate 12. Accordingly, the picture element corresponding to the actuator element 14 is in the ON state, and the ON state is expressed in a form of light emission. Moreover, the color of light emission corresponds to the color of the color filter 40.

That is, in the display device Da, the presence or absence of light emission (leakage light) at the front surface of the optical waveguide plate 12 can be controlled depending on the presence or absence of the contact of the plate member 32a of the displacement-transmitting section 32 with the color filter 40. Especially, in the display device Da according to the first embodiment, one unit for making the displacement action of the displacement-transmitting section 32 in the direction to make contact or separation with respect to the optical waveguide plate 12 may be recognized, for example, as one picture element. A large number of the picture elements are arranged in a matrix configuration or in a zigzag configuration concerning the respective rows. Therefore, it is possible to display a picture image (characters and graphics) corresponding to the image signal on the front surface of the optical waveguide plate 12, i.e., the display surface, in the same manner as the cathode ray tube, the liquid crystal display device, and the plasma display, by controlling the displacement action in each of the picture elements in accordance with the attribute of the inputted image signal.

In the gradation control over the display, it is possible to adopt the voltage modulation system and the time modulation system. For example, in the voltage modulation system, when one row is selected, voltages corresponding to the gradation of the respective actuator elements 14 are applied to a large number of the actuator elements 14 arranged on the selected row. The respective actuator elements 14 are displaced in the first direction in accordance with the level of the applied voltages. In the case of an example shown in FIG. 2, the displacement is made linearly to give displacement amounts of $Z_1, Z_2, \ldots Z_n$ for voltages $V_1, V_2, \ldots V_n$ respectively.

Figure 3:
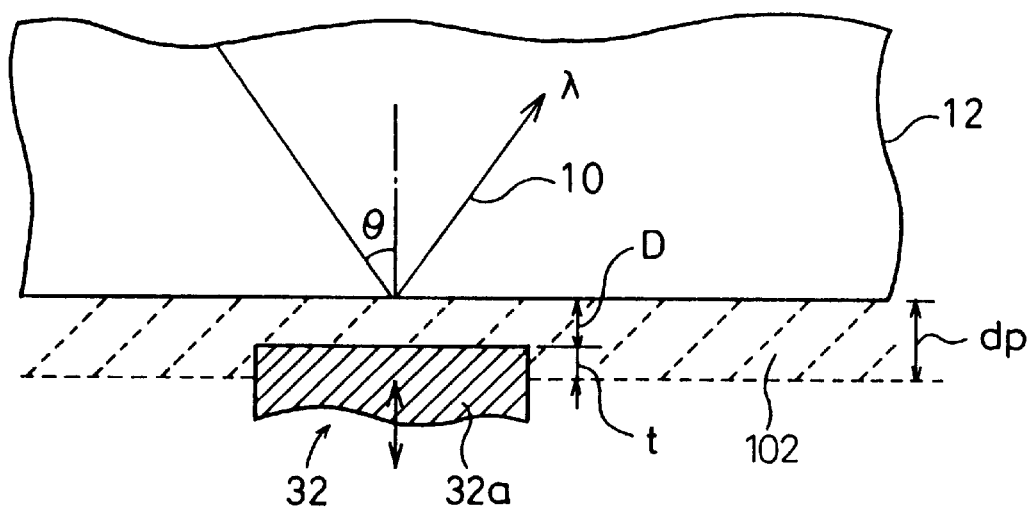
FIG. 3 illustrates the principle of gradation control based on the dot area and the contact property of the picture element and the evanescent effect.

For example, as shown in FIG. 3, at a point of time at which the actuator element 14 is displaced in a displacement amount of $Z_1$, the distance D between the first principal surface of the plate member 32a of the displacement-transmitting section 32 and the back surface of the optical waveguide plate 12 becomes a distance corresponding to the wavelength λ of the light 10 (the light introduced into the optical waveguide plate 12). For example, at a point of time at which the actuator element 14 is displaced in a displacement amount of $Z_n$, ideally the first principal surface of the plate member 32a completely contacts with the back surface of the optical waveguide plate 12.

When the displacement-transmitting section 32 approaches the back surface of the optical waveguide plate 12, and the distance between the plate member 32a of the displacement-transmitting section 32 and the back surface of the optical waveguide plate 12 is not more than the wavelength λ of the light 10, then the amount of the scattered light radiated from the surface of the optical waveguide plate 12 is increased in accordance with the decrease in the distance, and the brightness level of the picture element corresponding to the actuator element 14 is increased.

This phenomenon can be explained as follows in accordance with the evanescent effect. In general, as shown in FIG. 3, a region (evanescent region) 102, which is brought about on account of discharge of light (evanescent wave), exists, for example, around the back surface of the optical waveguide plate 12. The depth dp of the evanescent region 102 represents a depth at which the energy value of the evanescent wave is 1/e at the boundary between the optical waveguide plate 12 and the external space (the back surface of the optical waveguide plate 12 in this embodiment). The depth dp is given by the following expression (1). The energy E of the evanescent wave is given by the following expression (2).

$$dp = \lambda / [2\pi n_1 \sqrt{\{\sin^2 \theta - (n_2/n_2)^2\}}] \tag{1}$$

$$E = \exp\{-(D/dp)\} \tag{2}$$

In the expression, λ represents the wavelength of the light 10, and θ represents the angle (angle of incidence) at which the light 10 comes from the optical waveguide plate 12 into the external space as shown in FIG. 3. Further, $n_1$ represents the optical refractive index of the optical waveguide plate 12, and $n_2$ represents the optical refractive index of the external space.

According to the expression (1), it can be postulated that the depth dp is increased as the wavelength λ of the light 10 is increased, and the depth dp is increased as the angle of incidence θ approaches the critical angle. As shown in the expression (2), the energy E of the evanescent wave is increased as the object approaches the back surface of the optical waveguide plate 12, and the energy E is attenuated exponentially as the object is separated from the back surface of the optical waveguide plate 12. The amount of light (scattered light 42) reflected by the surface of the plate member 32*a* of the displacement-transmitting section 32 is proportional to the energy E of the evanescent wave. Accordingly, the amount of scattered light 42 is increased as the plate member 32*a* approaches the back surface of the optical waveguide plate 12, and the amount of light 42 is decreased exponentially as the plate member 32*a* is separated from the back surface of the optical waveguide plate 12.

In this process, the actuator element 14 continues to retain the displacement amount determined upon the selection owing to the shape-retaining effect exerted by the shape-retaining layer 26 of the actuator section 14. Accordingly, the light emission state of the picture element is maintained for a certain period of time.

When the display device is applied to the color display system, for example, it is preferable to construct one picture element by using three actuator sections 14 adjacent to one another (RGB arrangement) or four actuator sections 14 adjacent to one another (checked arrangement or the like), for example, depending on the color scheme of the color filter 40 (for example, three primary color filters and complementary color filters) disposed at the back of the optical waveguide plate 12.

As described above, in the display device Da according to the first embodiment, the scattered light 42 can be colored by using the color filter 40 even when the light source is not switched. Therefore, it is unnecessary to display a plurality of images within a prescribed one field period, and it is possible to provide enough time for the driving timing. Accordingly, the display device Da can sufficiently deal with the use of an actuator element 14 having a slow response speed. Further, it is possible to obtain high brightness and reduce production cost and electric power consumption.

The light 10 to be introduced into the optical waveguide plate 12 may be any one of those of ultraviolet, visible, and infrared regions. Those usable as the light source 100 include, for example, incandescent lamp, deuterium discharge lamp, fluorescent lamp, mercury lamp, metal halide lamp, halogen lamp, xenon lamp, tritium lamp, light emitting diode, laser, plasma light source, hot cathode tube, and cold cathode tube.

Next, explanation will be made for the respective constitutive components of the actuator element 14, especially for selection of materials for the respective constitutive components.

At first, it is preferable that the vibrating section 22 is composed of a highly heat-resistant material, because of the following reason. That is, when the actuator element 14 has a structure in which the vibrating section 22 is directly supported by the fixed section 24 without using any material such as an organic adhesive which is inferior in heat resistance, the vibrating section 22 is preferably composed of a highly heat-resistant material so that the vibrating section 22 is not deteriorated in quality at least during the formation of the shape-retaining layer 26.

It is preferable that the vibrating section 22 is composed of an electrically insulative material in order to electrically separate the wiring (for example, row selection line) connected with the row electrode 28*a* of the pair of electrodes 28 formed on the substrate 18, from the wiring (for example, signal line) connected with the column electrode 28*b*.

Therefore, the vibrating section 22 may be composed of a material such as a highly heat-resistant metal and a porcelain enamel produced by coating a surface of such a metal with a ceramic material such as glass. However, the vibrating section 22 is optimally composed of a ceramic.

Those usable as the ceramic for constructing the vibrating section 22 include, for example, stabilized zirconium oxide, aluminum oxide, magnesium oxide, titanium oxide, spinel, mullite, aluminum nitride, silicon nitride, glass, and mixtures thereof. Stabilized zirconium oxide is especially preferred because of, for example, high mechanical strength obtained even when the thickness of the vibrating section 22 is thin, high toughness, and small chemical reactivity with the shape-retaining layer 26 and the pair of electrodes 28. The term "stabilized zirconium oxide" includes completely stabilized zirconium oxide and partially stabilized zirconium oxide. Stabilized zirconium oxide has a crystal structure such as cubic crystal, and hence it does not cause phase transition.

On the other hand, zirconium oxide causes phase transition between monoclinic crystal and tetragonal crystal at about 1000° C. Cracks appear during the phase transition in some cases. Stabilized zirconium oxide contains 1 to 30 mole % of a stabilizer such as calcium oxide, magnesium oxide, yttrium oxide, scandium oxide, ytterbium oxide, cerium oxide, and oxides of rare earth metals. In order to enhance the mechanical strength of the vibrating section 22, the stabilizer preferably comprises yttrium oxide. In this composition, yttrium oxide is contained preferably in an amount of 1.5 to 6 mole %, and more preferably 2 to 4 mole %. It is preferable that aluminum oxide is further contained in an amount of 0.1 to 5 mole %.

The crystal phase may be, for example, a mixed phase of cubic crystal+monoclinic crystal, a mixed phase of tetragonal crystal+monoclinic crystal, and a mixed phase of cubic crystal+tetragonal crystal+monoclinic crystal. However, among them, most preferred are those having a principal crystal phase composed of tetragonal crystal or a mixed phase of tetragonal crystal+cubic crystal, from viewpoints of strength, toughness, and durability.

When the vibrating section 22 is composed of a ceramic, a large number of crystal grains construct the vibrating section 22. In order to increase the mechanical strength of the vibrating section 22, the crystal grains preferably have an average grain diameter of 0.05 to 2 μm, and more preferably 0.1 to 1 μm.

The fixed section 24 preferably composed of a ceramic. The fixed section 24 may be composed of the same ceramic material as that used for the vibrating section 22, or the fixed section 24 may be composed of a ceramic material different from that used for the vibrating section 22. Those usable as the ceramic material for constructing the fixed section 24 include, for example, stabilized zirconium oxide, aluminum oxide, magnesium oxide, titanium oxide, spinel, mullite, aluminum nitride, silicon nitride, glass, and mixtures thereof, in the same manner as the material for the vibrating section 22.

Especially, those preferably adopted for the substrate 18 used in the display device Da according to the first embodiment include, for example, materials containing a major component of zirconium oxide, materials containing a major component of aluminum oxide, and materials containing a major component of a mixture thereof. Among them, those containing a major component of zirconium oxide are more preferable.

Clay or the like is added as a sintering aid in some cases. However, it is necessary to control components of the sintering aid in order not to contain an excessive amount of those liable to form glass such as silicon oxide and boron oxide because of the following reason. That is, although the materials which are liable to form glass are advantageous to join the substrate 18 to the shape-retaining layer 26, the materials facilitate the reaction between the substrate 18 and the shape-retaining layer 26, making it difficult to maintain a predetermined composition of the shape-retaining layer 26. As a result, the materials make a cause to deteriorate the element characteristics.

That is, it is preferable that silicon oxide or the like in the substrate 18 is restricted to have a weight ratio of not more than 3%, and more preferably not more than 1%. The term "major component" herein refers to a component which exists in a proportion of not less than 50% in weight ratio.

As described above, those usable as the shape-retaining layer 26 include piezoelectric/electrostrictive layers and anti-ferroelectric layers. However, when the piezoelectric/ electrostrictive layer is used as the shape-retaining layer 26, it is possible to use, as the piezoelectric/electrostrictive layer, ceramics containing, for example, lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, or any combination of them.

It is needless to say that the major component contains the compound as described above in an amount of not less than 50% by weight. Among the ceramics described above, the ceramic containing lead zirconate is most frequently used as the constitutive material of the piezoelectric/electrostrictive layer for constructing the shape-retaining layer 26.

When the piezoelectric/electrostrictive layer is composed of a ceramic, it is also preferable to use ceramics obtained by appropriately adding, to the ceramics described above, oxide of, for example, lanthanum, calcium, strontium, molybdenum, tungsten, barium, niobium, zinc, nickel, and manganese, or any combination thereof or another type of compound thereof. For example, it is preferable to use a ceramic containing a major component composed of lead magnesium niobate, lead zirconate, and lead titanate and further containing lanthanum and strontium.

The piezoelectric/electrostrictive layer may be either dense or porous. When the piezoelectric/electrostrictive layer is porous, its porosity is preferably not more than 40%.

When the anti-ferroelectric layer is used as the shape-retaining layer 26, it is desirable to use, as the anti-ferroelectric layer, a compound containing a major component composed of lead zirconate, a compound containing a major component composed of lead zirconate and lead stannate, a compound obtained by adding lanthanum to lead zirconate, and a compound obtained by adding lead zirconate and lead niobate to a component composed of lead zirconate and lead stannate.

Especially, when an anti-ferroelectric film, which contains a component comprising lead zirconate and lead stannate as represented by the following composition, is applied as a film-type element such as the actuator element 14, it is possible to perform driving at a relatively low voltage. Therefore, application of such an anti-ferroelectric film is especially preferred.

$$Pb_{0.99}Nb_{0.02}[(Zr_xSn_{1-x})_{1-y}Ti_y]_{0.98}O_3$$

wherein, $0.5 < x < 0.6$, $0.05 < y < 0.063$, $0.01 < Nb < 0.03$

The anti-ferroelectric film may be porous. When the anti-ferroelectric film is porous, it is desirable that the porosity is not more than 30%.

It is preferable that the thickness of the vibrating section 22 of the substrate 18 have a dimension identical to that of the thickness of the shape-retaining layer 26 formed on the vibrating section 22, because of the following reason. That is, if the thickness of the vibrating section 22 is extremely thicker than the thickness of the shape-retaining layer 26 (if the former is different from the latter by not less than one figure), when the shape-retaining layer 26 makes shrinkage upon sintering, the vibrating section 22 behaves to inhibit the shrinkage. For this reason, the stress at the boundary surface between the shape-retaining layer 26 and the substrate 18 is increased, and consequently they are easily peeled off from each other. On the contrary, when the dimension of the thickness is in an identical degree between the both, it is easy for the substrate 18 (vibrating section 22) to follow the shrinkage of the shape-retaining layer 26 upon sintering. Accordingly, such dimension of the thickness is preferred to achieve integration. Specifically, the vibrating section 22 preferably has a thickness of 1 to 100 μm, more preferably 3 to 50 μm, and much more preferably 5 to 20 μm. On the other hand, the shape-retaining layer 26 preferably has a thickness of 5 to 100 μm, more preferably 5 to 50 μm, and much more preferably 5 to 30 μm.

The pair of electrodes 28 formed on the shape-retaining layer 26 are allowed to have an appropriate thickness depending on the use or application. However, the thickness is preferably 0.01 to 50 μm, and more preferably 0.1 to 5 μm. The pair of electrodes 28 are preferably composed of a conductive metal which is solid at room temperature. The metal includes, for example, metal simple substances or alloys containing, for example, aluminum, titanium, chromium, iron, cobalt, nickel, copper, zinc, niobium, molybdenum, ruthenium, rhodium, silver, stannum, tantalum, tungsten, iridium, platinum, gold, and lead. It is needless to say that these elements may be contained in an arbitrary combination.

The displacement-transmitting member 32b of the displacement-transmitting section 32 preferably has a hardness in a degree to directly transmit the displacement of the actuator element 14 to the optical waveguide plate 12. Therefore, those preferably used as materials for the displacement-transmitting member 32b include, for example, rubber, organic resins, organic adhesive films, and glass. However, it is allowable to use the electrode layer itself, or materials such as the piezoelectric materials and the ceramics described above. Those most preferably used include, for example, organic resins and organic adhesive films based on epoxy compounds, acrylic compounds, silicone compounds, and polyolefin compounds. Further, it is also effective to mix a filler with the foregoing compounds to suppress shrinkage upon curing.

Those desirably used as materials for the plate member 32a include the materials for the displacement-transmitting member 32b described above, as well as materials obtained by finely dispersing ceramic powder having a high refractive index, such as zirconia powder, titania powder, lead oxide powder, and mixed powder thereof, in an organic resin based on, for example, an epoxy, acrylic, or silicone compound, from viewpoints of light emission efficiency and maintenance of flatness. In this case, it is preferable to select a ratio of resin weight:ceramic powder weight=1:(0.1 to 10). Further, it is preferable to add, to the foregoing composition, glass powder having an average particle diameter of 0.5 to 10 μm in a ratio of 1:(0.1 to 1.0) with respect to the ceramic powder, because release property and contact property with respect to the surface of the optical waveguide plate 12 are improved.

Preferably, the flatness or the smoothness of the portion (surface) of the plate member 32a to contact with the optical waveguide plate 12 is sufficiently small as compared with the displacement amount of the actuator element 14, which is specifically not more than 1 μm, more preferably not more than 0.5 μm, and especially preferably not more than 0.1 μm. However, the flatness of the portion (surface) of the displacement-transmitting section 32 to contact with the optical waveguide plate 12 is important in order to reduce the clearance generated when the displacement-transmitting section 32 contacts with the optical waveguide plate 12. Accordingly, there is no limitation to the foregoing flatness range, provided that the contact portion makes deformation in a state of contact.

When the material described above is used for the displacement-transmitting section 32, the displacement-transmitting section 32 may be connected to the main actuator element 30 by stacking the displacement-transmitting section 32 composed of the material described above by using an adhesive, or by forming the displacement-transmitting section 32 on the upper portion of the main actuator element 30 or on the optical waveguide plate 12, in accordance with, for example, a method for coating a solution, a paste, or a slurry composed of the material described above.

When the displacement-transmitting section 32 is connected with the main actuator element 30, it is preferable to use a material for the displacement-transmitting member 32b which also serves as an adhesive. Especially, in the case of the use of an organic adhesive film, it is also used as an adhesive by applying heat thereto. Therefore, the use of an organic adhesive film is preferred.

The optical waveguide plate 12 has an optical refractive index with which the light 10 introduced into the inside thereof is totally reflected by the front and back surfaces without being transmitted to the outside of the optical waveguide plate 12. It is necessary for the optical waveguide plate 12 to use those having a large and uniform light transmittance in the wavelength region of the light to be introduced. The material for the optical waveguide plate 12 is not specifically limited provided that it satisfies the foregoing characteristic. However, specifically, those generally used for the optical waveguide plate 12 include, for example, glass, quartz, light-transmissive plastics such as acrylic plastics, light-transmissive ceramics, structural materials comprising a plurality of layers composed of materials having different refractive indexes, and those having a surface coating layer.

Next, a display device Db according to the second embodiment will be explained with reference to FIG. 4. Components or parts corresponding to those shown in FIG. 1 are designated by the same reference numerals, duplicate explanation of which will be omitted.

Figure 4:
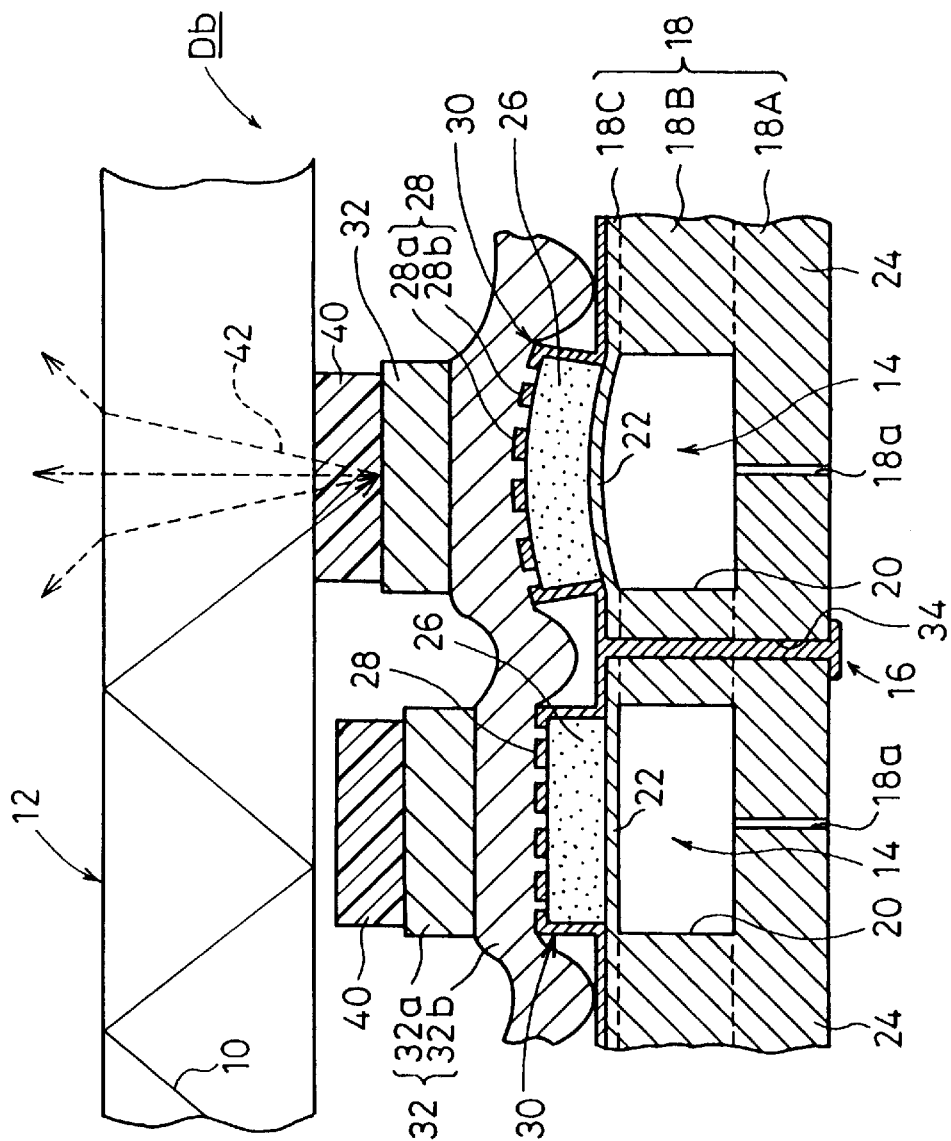
FIG. 4 shows a cross-sectional arrangement illustrating a display device according to the second embodiment.

As shown in FIG. 4, the display device Db according to the second embodiment is constructed in approximately the same manner as the display device Da according to the first embodiment (see FIG. 1). However, the former is different from the latter in that a color filter 40 is formed on an end surface of the plate member 32a (white scattering element) of the displacement-transmitting section 32.

In this embodiment, when a certain actuator element 14 is in the selected state, and the end surface of the color filter 40 corresponding to the actuator element 14 contacts with the back surface of the optical waveguide plate 12 at a distance of not more than the wavelength of light, then the light 10, which has been subjected to total reflection in the optical waveguide plate 12, is transmitted to the surface of the displacement-transmitting section 32 through the color filter 40. Thus, the scattered light 42 is produced, which gives a color corresponding to the color of the color filter 40.

In the display device Db according to the second embodiment, it is also unnecessary to switch the light source 100, in the same manner as the display device Da according to the first embodiment. Accordingly, the display device Db can sufficiently deal with the use of an actuator element 14 having a slow response speed. Further, it is possible to obtain high brightness and reduce production cost and electric power consumption.

In the case of the display device Da according to the first embodiment (see FIG. 1), there is the following likelihood. That is, when the actuator element 14 is in the initial state, or when it is in the OFF state (light-off state) in which the bending displacement is reset, then the light 10 passing through the optical waveguide plate 12 makes irregular reflection at the boundary between the color filter 40 and the external space, or in the color filter 40 if the color filter 40 includes, for example, voids and impurities, and the light is leaked toward the surface of the optical waveguide plate 12.

However, in the display device Db according to the second embodiment, the color filter 40 is completely separated from the optical waveguide plate 12 when the actuator element 14 is in the initial state, or when it is in the OFF state (light-off state) in which the bending displacement is reset. Accordingly, the display device Db is advantageous in that the leakage of the light 10 as described above does not occur, and it is possible to realize improvement in contrast.

Next, a display device Dc according to the third embodiment will be explained with reference to FIG. 5. Components or parts corresponding to those shown in FIG. 4 are designated by the same reference numerals, duplicate explanation of which will be omitted.

Figure 5:
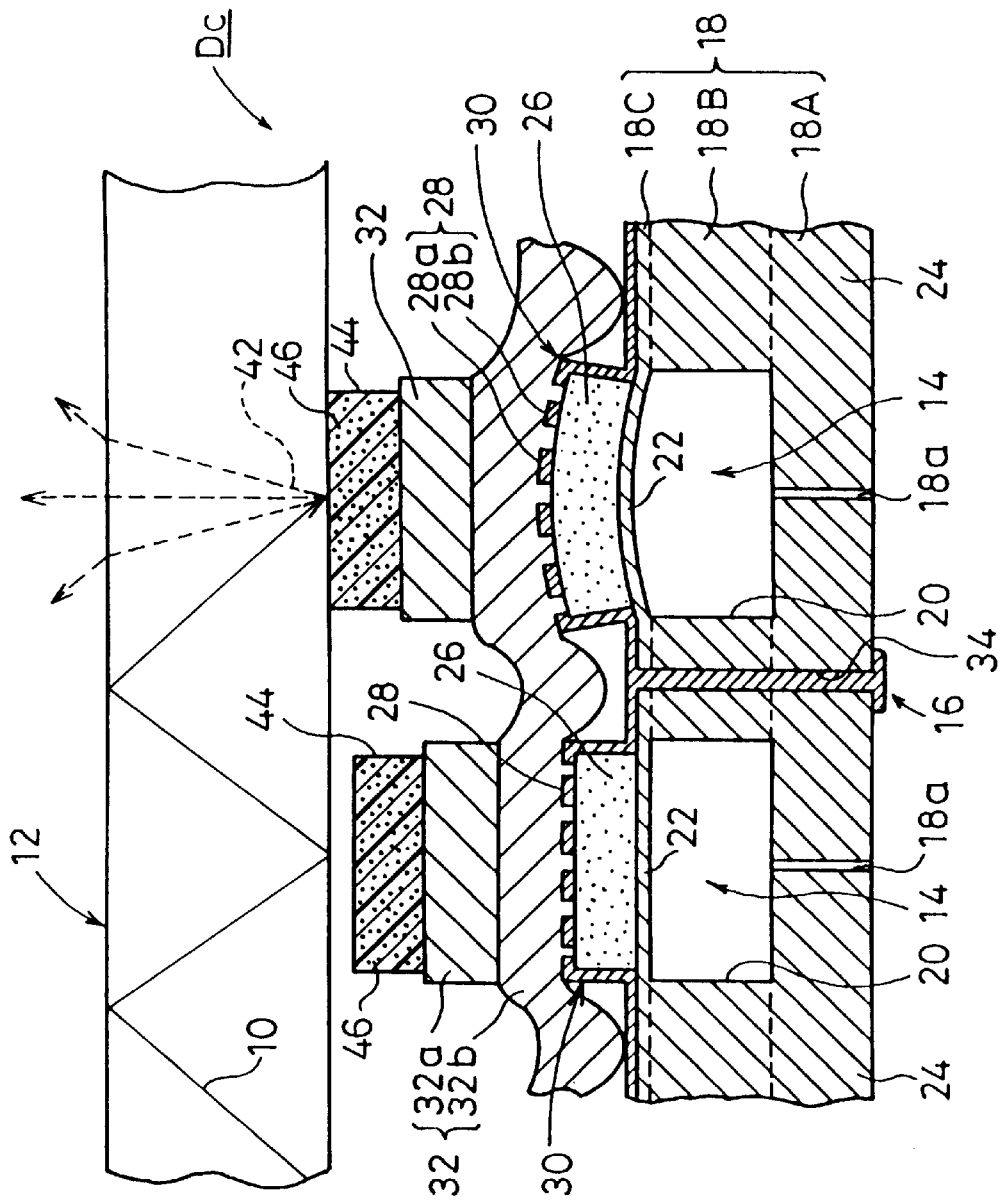
FIG. 5 shows a cross-sectional arrangement illustrating a display device according to the third embodiment.

As shown in FIG. 5, the display device Dc according to the third embodiment is constructed in approximately the same manner as the display device Db according to the second embodiment (see FIG. 4). However, the former is different from the latter in that a colored scattering element 44 is formed on an end surface of the plate member 32a of the displacement-transmitting section 32 in place of the color filter 40. The colored scattering element 44 is an opaque element, which is obtained, for example, by dispersing a coloring matter 46 such as a pigment in a resin or the like.

In this embodiment, when a certain actuator element 14 is in the selected state, and the end surface of the colored scattering element 44 corresponding to the actuator element 14 contacts with the back surface of the optical waveguide plate 12 at a distance of not more than the wavelength of the light 10, then the light 10, which has been subjected to total reflection in the optical waveguide plate 12, is reflected by the surface of the colored scattering element 44 (exactly, the coloring matter 46 mixed in the colored scattering element 44). Thus, the light behaves as scattered light 42. A part of the scattered light 42 is reflected again at the inside of the optical waveguide plate 12. However, almost all of the scattered light 42 is not reflected by the optical waveguide plate 12, and it is transmitted through the front surface (face) of the optical waveguide plate 12. Accordingly, the picture element corresponding to the actuator element 14 is in the ON state, and the state is expressed in a form of light emission. Moreover, the color of light emission is a color corresponding to the coloring matter of the colored scattering element 44.

Therefore, when the displace device Dc is applied to the color display system, it is convenient to prepare colored scattering elements 44 mixed with coloring matters 46 for giving necessary colors (red, green, and blue) respectively, i.e., red, green, and blue scattering elements. For example, the respective scattering elements are configured while giving one set comprising three actuator elements 14 adjacent to one another (RGB arrangement). Thus, it is possible to realize color display.

In the display device Dc according to the third embodiment, it is unnecessary to switch the light source 100, in the same manner as the display device Db according to the second embodiment. Accordingly, the display device Dc can sufficiently deal with the use of an actuator element 14 having a slow response speed. Further, it is possible to obtain high brightness and reduce production cost and electric power consumption. Moreover, the display device Dc is advantageous in that it is possible to realize improvement in contrast.

The plate member 32a of the displacement-transmitting section 32 and the colored scattering element 44 formed thereon may be integrated into one unit. In this arrangement, the materials for constructing the plate member 32a and the colored scattering element 44 are selected from those belonging to a wider range. Therefore, it is possible to obtain light emission of various colors. Further, the integration as described above provides a thin film. Therefore, the displacement-transmitting section 32 can have a light weight. Accordingly, it is possible to improve the response speed.

Next, a display device Dd according to the fourth embodiment will be explained with reference to FIG. 6. Components or parts corresponding to those shown in FIG. 1 are designated by the same reference numerals, duplicate explanation of which will be omitted.

Figure 6:
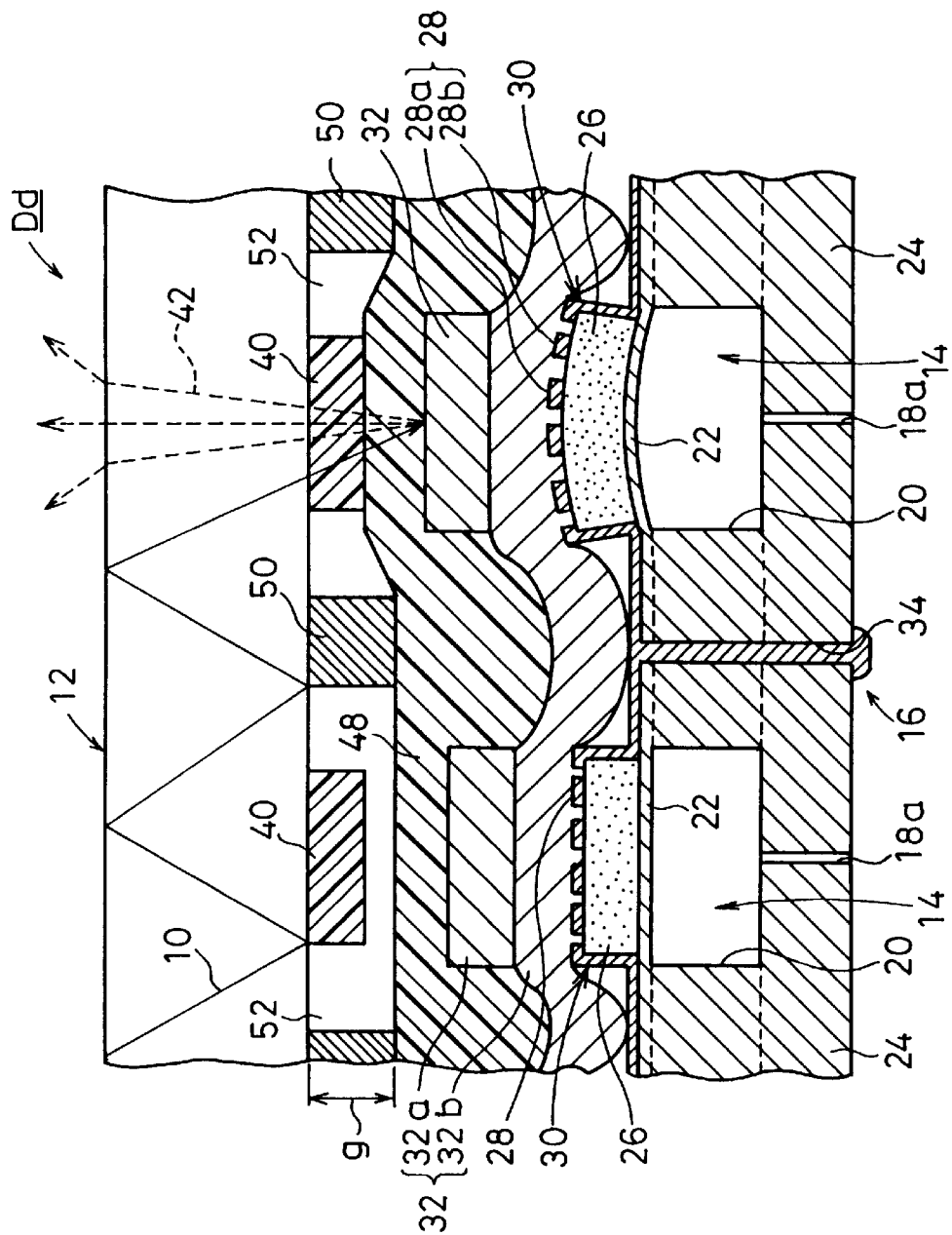
FIG. 6 shows a cross-sectional arrangement illustrating a display device according to the fourth embodiment.

As shown in FIG. 6, the display device Dd according to the fourth embodiment is constructed in approximately the same manner as the display device Da according to the first embodiment (see FIG. 1). However, the former is different from the latter in that a transparent layer 48 is formed over the entire surface including the displacement-transmitting section 32, and a gap g is provided between the transparent layer 48 and the optical waveguide plate 12, and in that a black matrix layer 50 is formed at positions corresponding to portions other than the picture elements (portions at which the color filters 40 are not formed), of the gap g.

Portions of the gap g other than those corresponding to the color filters 40 and the black matrix layer 50 are used as air layers 52. The transparent layer 48 is a resin layer composed of an acrylic or epoxy compound selected to have approximately the same optical refractive index as that of the optical waveguide plate 12. Alternatively, it is allowable to use an optical film such as those made of $SiO_2$ and SiN. It is preferable for the black matrix layer 50 to use, for example, a metal film such as those made of Cr, Al, Ni, and Ag, because of the following reason. That is, such a metal film absorbs a small amount of light, and hence it is possible to suppress attenuation and scattering of the light 10 transmitted through the optical waveguide plate 12. Of course, it is not necessarily indispensable to form the black matrix layer 50.

When a certain actuator element 14 is in the selected state, and the end surface of the transparent layer 48 contacts with the end surface of the color filter 40 formed on the back surface of the optical waveguide plate 12 at a distance of not more than the wavelength of light, then the light 10, which has been subjected to total reflection in the optical waveguide plate 12, is transmitted through the color filter 40 and the transparent layer 48 to the surface of the plate member 32a (white scattering element) of the displacement-transmitting section 32. Thus, the scattered light 42 is produced, which gives a color corresponding to the color of the color filter 40.

In the display device Dd according to the fourth embodiment, it is also unnecessary to switch the light source 100, in the same manner as the display device Da according to the first embodiment. Accordingly, the display device Dd can sufficiently deal with the use of an actuator element 14 having a slow response speed. Further, it is possible to obtain high brightness and reduce production cost and electric power consumption.

Next, a display device De according to the fifth embodiment will be explained with reference to FIG. 7. Components or parts corresponding to those shown in FIG. 6 are designated by the same reference numerals, duplicate explanation of which will be omitted.

Figure 7:
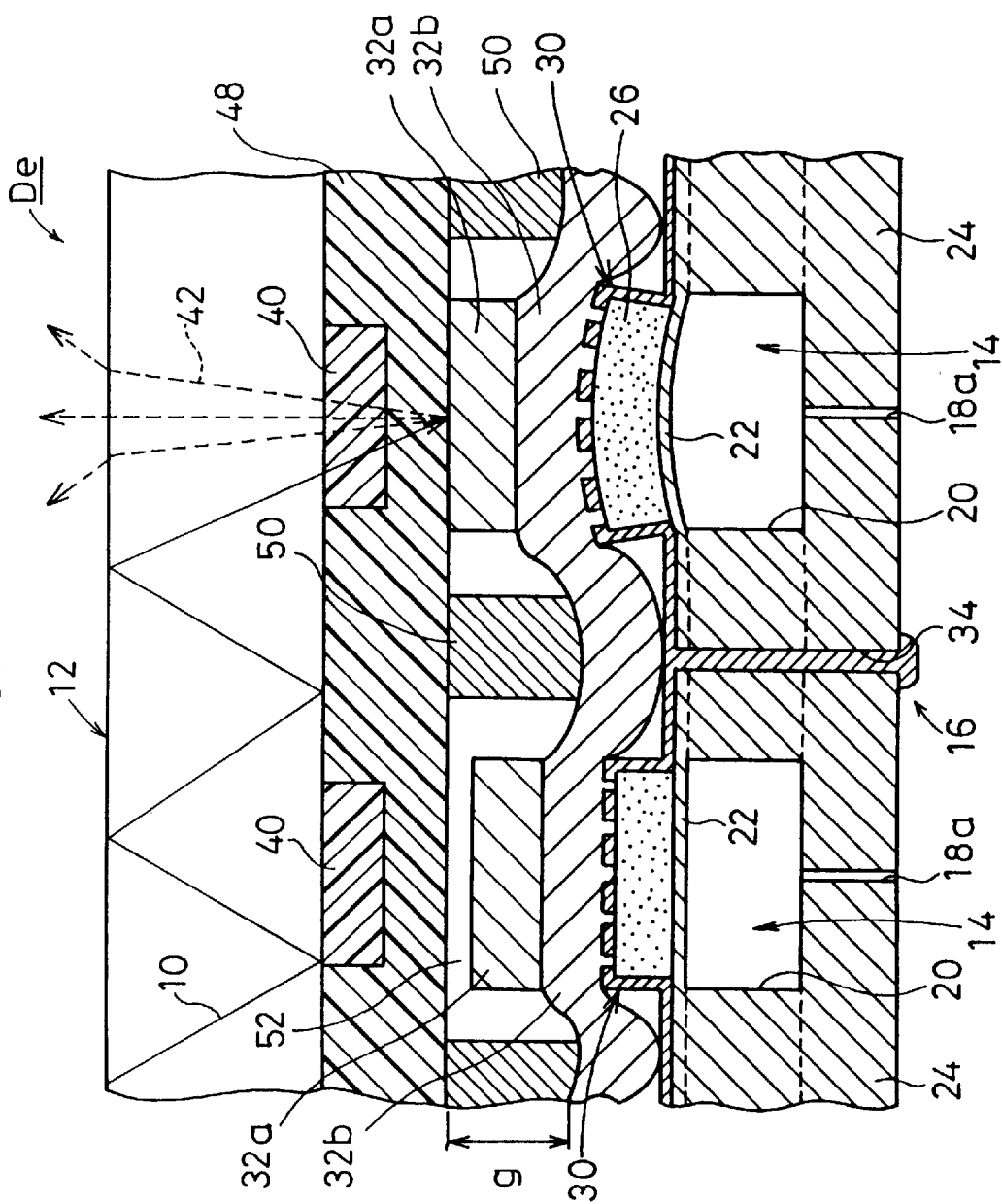
FIG. 7 shows a cross-sectional arrangement illustrating a display device according to the fifth embodiment.

As shown in FIG. 7, the display device De according to the fifth embodiment is constructed in approximately the same manner as the display device Dd according to the fourth embodiment (see FIG. 6). However, the former is different from the latter in that a transparent layer 48 is formed over the entire back surface of the optical waveguide plate 12 (the entire surface including the color filter 40), and a gap g is provided between the transparent layer 48 and the displacement-transmitting member 32b of the displacement-transmitting section 32, and in that a black matrix layer 50 is formed at positions corresponding to portions other than the picture elements (portions at which the plate members 32 of the displacement transmitting sections 32 are not formed), of the gap g.

In this embodiment, when a certain actuator element 14 is in the selected state, and the end surface of the plate member 32a (white scattering element) of the displacement-transmitting section 32 contacts with the end surface of the transparent layer 48 formed on the back surface of the optical waveguide plate 12 at a distance of not more than the wavelength of the light 10, then the light 10, which has been subjected to total reflection in the optical waveguide plate 12, is transmitted through the color filter 40 and the transparent layer 48 to the surface of the plate member 32a of the displacement-transmitting section 32. Thus, the scattered light 42 is produced, which gives a color corresponding to the color of the color filter 40.

In the display device De according to the fifth embodiment, it is also unnecessary to switch the light source 100, in the same manner as the display device Dd according to the fourth embodiment. Accordingly, the display device De can sufficiently deal with the use of an actuator element 14 having a slow response speed. Further, it is possible to obtain high brightness and reduce production cost and electric power consumption.

Next, a display device Df according to the sixth embodiment will be explained with reference to FIG. 8. Components or parts corresponding to those shown in FIG. 6 are designated by the same reference numerals, duplicate explanation of which will be omitted.

Figure 8:
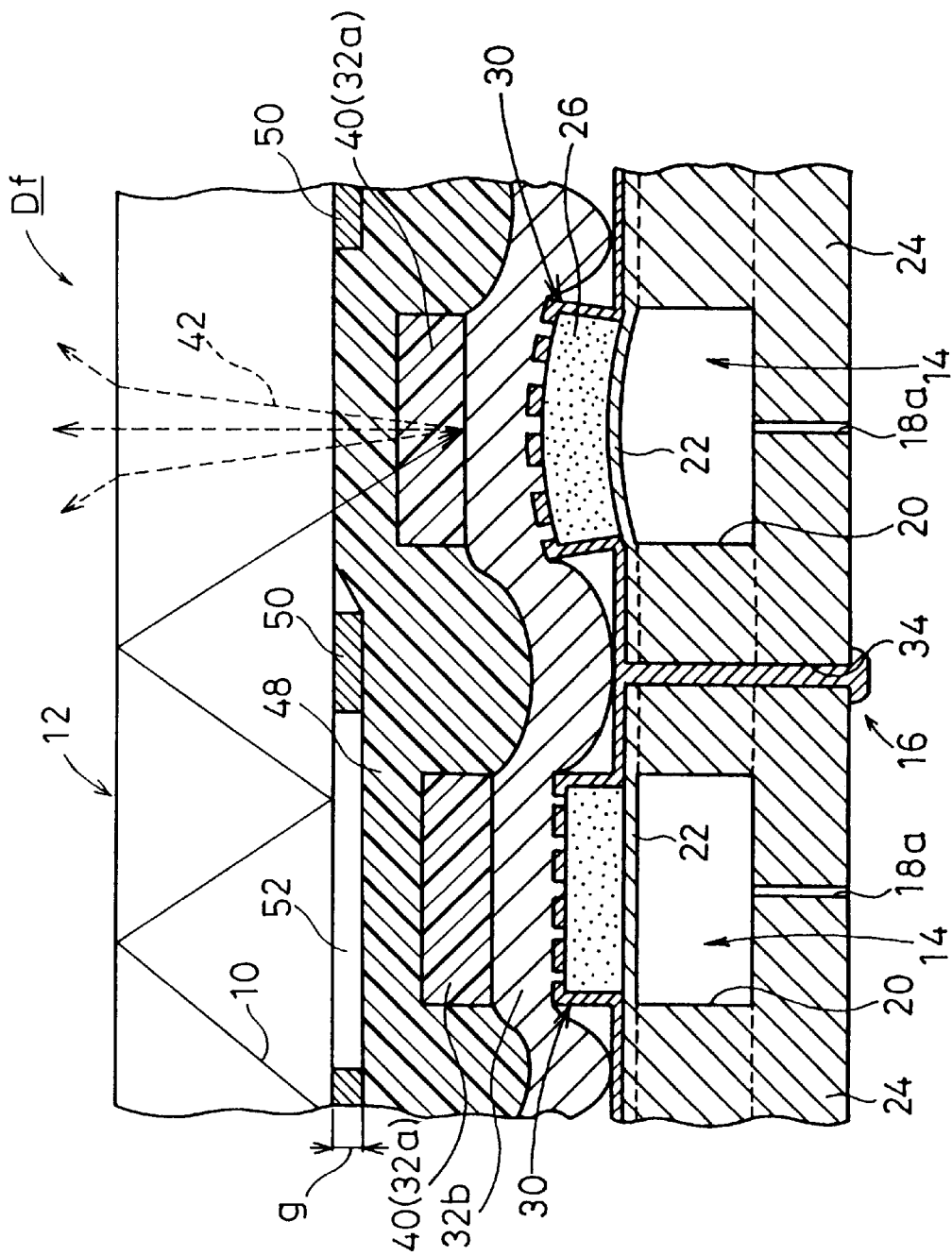
FIG. 8 shows a cross-sectional arrangement illustrating a display device according to the sixth embodiment.

As shown in FIG. 8, the display device Df according to the sixth embodiment is constructed in approximately the same manner as the display device Dd according to the fourth embodiment (see FIG. 6). However, the former is different from the latter in that the plate member 32a of the displacement-transmitting section 32 is constructed by a color filter 40, and the displacement-transmitting section 32 is constructed by a white scattering element. That is, the displace device Df is constructed such that the color filter 40 is also used as the plate member 32a of the displacement-transmitting section 32.

In this embodiment, when a certain actuator element 14 is in the selected state, and the end surface of the transparent layer 48 contacts with the back surface of the optical waveguide plate 12 at a distance of not more than the wavelength of the light 10, then the light 10, which has been subjected to total reflection in the optical waveguide plate 12, is transmitted through the transparent layer 48 and the color filter 40 to the surface of the displacement-transmitting member 32b (white scattering element) of the displacement-transmitting section 32. Thus, the scattered light 42 is produced, which gives a color corresponding to the color of the color filter 40.

In the display device Df according to the sixth embodiment, it is also unnecessary to switch the light source 100, in the same manner as the display device Dd according to the fourth embodiment. Accordingly, the display device Df can sufficiently deal with the use of an actuator element 14 having a slow response speed. Further, it is possible to obtain high brightness and reduce production cost and electric power consumption.

Especially, in the display device Df according to the sixth embodiment, the color filter 40 is also used as the plate member 32a of the displacement-transmitting section 32. Therefore, it is unnecessary to consider the thickness of the color filter 40 when the gap g is formed. Accordingly, it is possible to shorten the width of separation between the optical waveguide plate 12 and the driving section 16. This results in realization of the display device Df having a thin size.

Next, a display device Dg according to the seventh embodiment will be explained with reference to FIG. 9. Components or parts corresponding to those shown in FIG. 8 are designated by the same reference numerals, duplicate explanation of which will be omitted.

Figure 9:
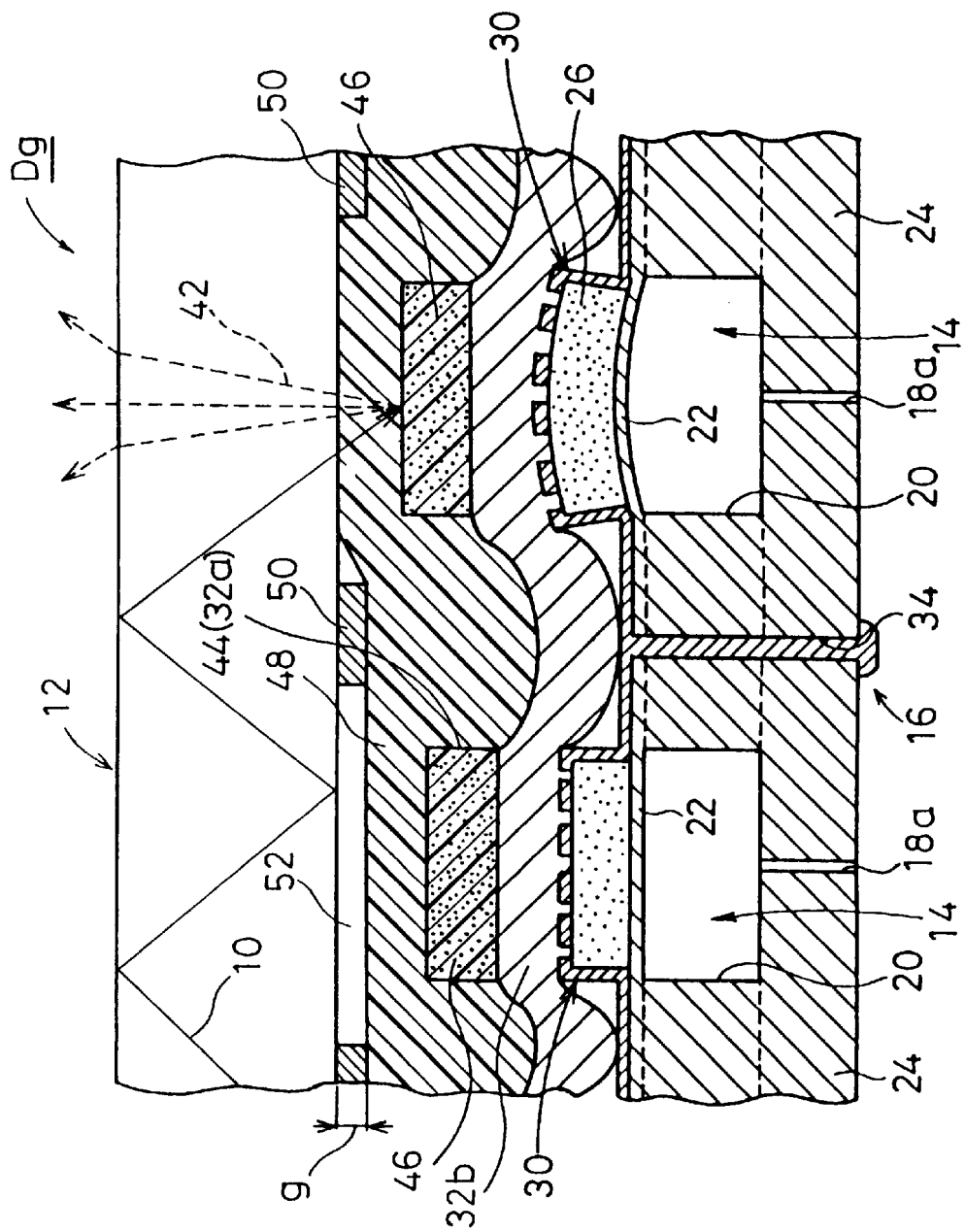
FIG. 9 shows a cross-sectional arrangement illustrating a display device according to the seventh embodiment.

As shown in FIG. 9, the display device Dg according to the seventh embodiment is constructed in approximately the same manner as the display device Df according to the sixth embodiment (see FIG. 8). However, the former is different from the latter in that a colored scattering element 44 is also used as the plate member 32a of the displacement-transmitting section 32, in place of the color filter 40.

In this embodiment, when a certain actuator element 14 is in the selected state, and the end surface of the transparent layer 48 contacts with the back surface of the optical waveguide plate 12 at a distance of not more than the wavelength of light, then the light 10, which has been subjected to total reflection in the optical waveguide plate 12, is transmitted through the transparent layer 48, and it is reflected by the surface of the colored scattering element 44. Thus, the scattered light 42 is produced, which gives a color corresponding to a coloring matter 46 of the colored scattering element 44.

In the display device Dg according to the seventh embodiment, it is also unnecessary to switch the light source 100, in the same manner as the display device Df according to the sixth embodiment. Accordingly, the display device Dg can sufficiently deal with the use of an actuator element 14 having a slow response speed. Further, it is possible to obtain high brightness and reduce production cost and electric power consumption. Since the colored scattering element 44 is also used as the plate member 32a of the displacement-transmitting section 32, it is possible to shorten the width of separation between the optical waveguide plate 12 and the driving section 16.

Next, a display device Dh according to the eighth embodiment will be explained with reference to FIG. 10. Components or parts corresponding to those shown in FIG. 9 are designated by the same reference numerals, duplicate explanation of which will be omitted.

Figure 10:
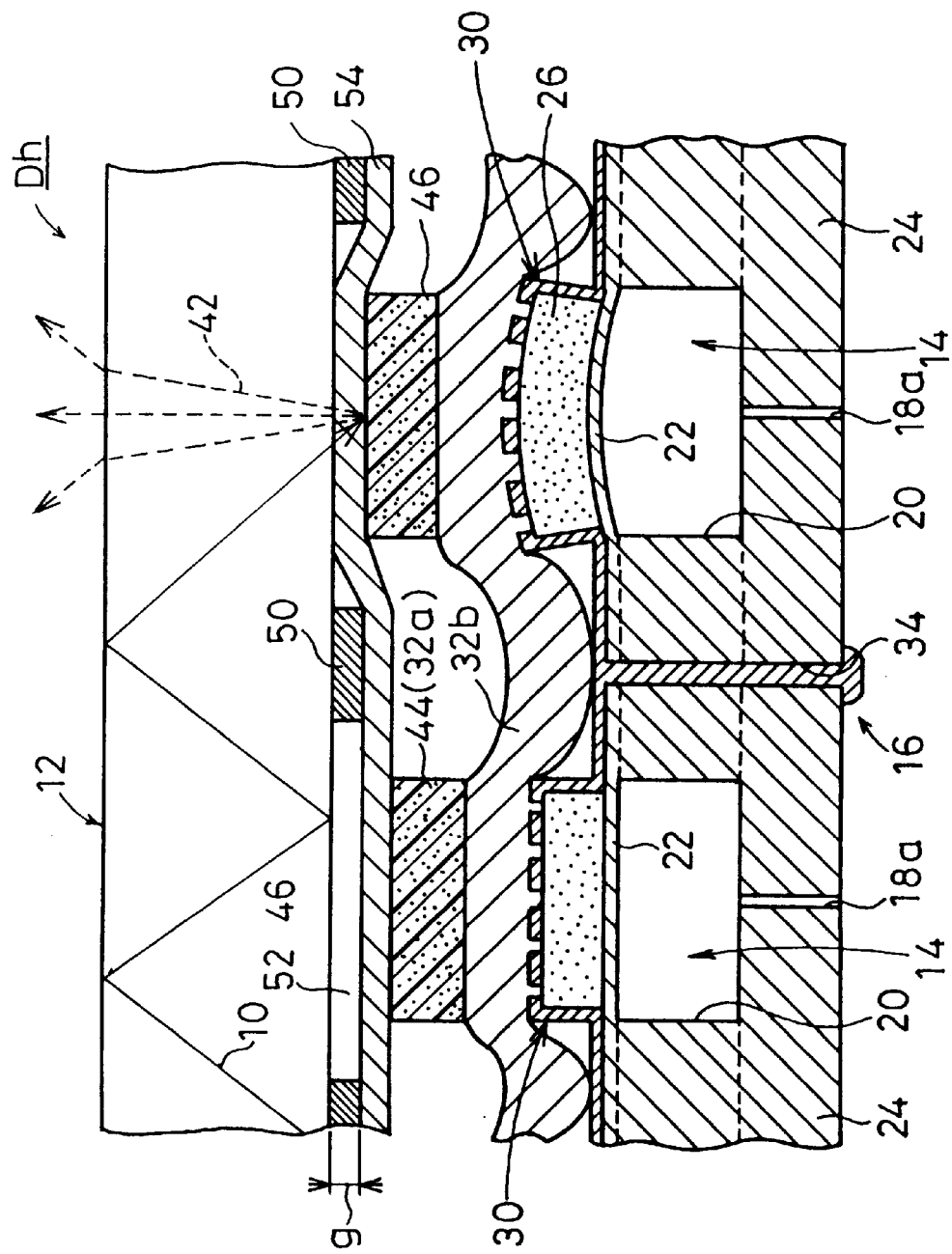
FIG. 10 shows a cross-sectional arrangement illustrating a display device according to the eighth embodiment.

As shown in FIG. 10, the display device Dh according to the eighth embodiment is constructed in approximately the same manner as the display device Dg according to the seventh embodiment (see FIG. 9). However, the former is different from the latter in that one sheet of thin film-shaped second displacement-transmitting member (transparent) 54 is glued to end surfaces of the respective colored scattering elements 44, without forming the transparent layer 48 over the entire surface. The second displacement-transmitting member 54 can be constructed by using the same or equivalent material as that used for the displacement-transmitting member 32b of the displacement-transmitting section 32.

When a certain actuator element 14 is in the selected state, and the end surface of the second displacement-transmitting member 54 contacts with the back surface of the optical waveguide plate 12 at a distance of not more than the wavelength of the light 10, then the light 10, which has been subjected to total reflection in the optical waveguide plate 12, is transmitted through the second displacement-transmitting member 54, and it is reflected by the surface of the colored scattering element 44. Thus, the scattered light 42 is produced, which gives a color corresponding to a coloring matter 46 of the colored scattering element 44.

In the display device Dh according to the eighth embodiment, it is also unnecessary to switch the light source 100, in the same manner as the display device Dg according to the seventh embodiment. Accordingly, the display device Dh can sufficiently deal with the use of an actuator element 14 having a slow response speed. Further, it is possible to obtain high brightness and reduce production cost and electric power consumption. Since the colored scattering element 44 is also used as the plate member 32a of the displacement-transmitting section 32, it is possible to shorten the width of separation between the optical waveguide plate 12 and the driving section 16.

Next, a display device Di according to the ninth embodiment will be explained with reference to FIG. 11. Components or parts corresponding to those shown in FIG. 10 are designated by the same reference numerals, duplicate explanation of which will be omitted.

Figure 11:
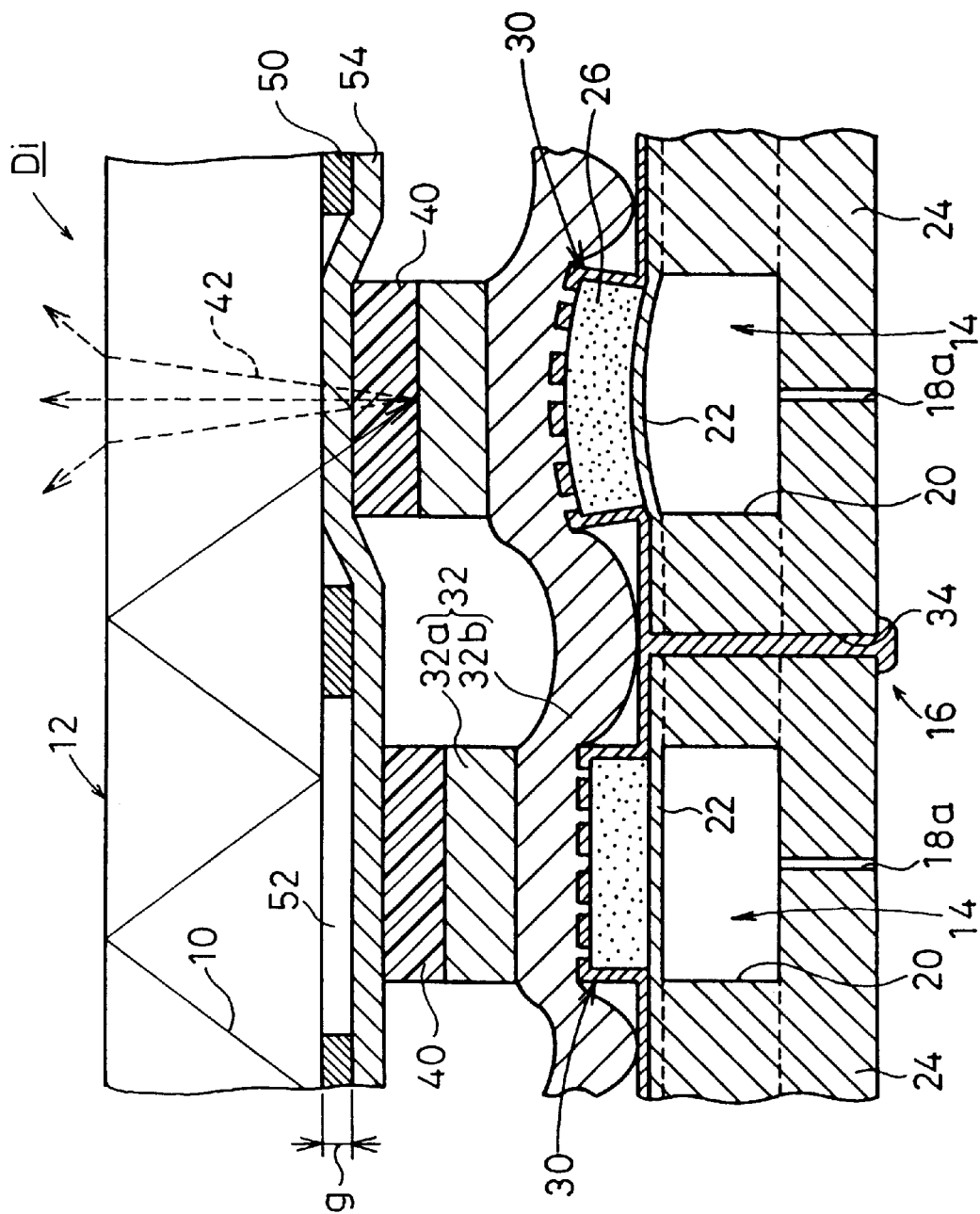
FIG. 11 show a cross-sectional arrangement illustrating a display device according to the ninth embodiment.

As shown in FIG. 11, the display device Di according to the ninth embodiment is constructed in approximately the same manner as the display device Dh according to the eighth embodiment (see FIG. 10). However, the former is different from the latter in that a color filter 40 is formed on the plate member 32a of each of the displacement-transmitting sections 32, and one sheet of thin film-shaped second displacement-transmitting member (transparent) 54 is glued to end surfaces of the respective color filters 40.

In this embodiment, when a certain actuator element 14 is in the selected state, and the end surface of the second displacement-transmitting member 54 contacts with the back surface of the optical waveguide plate 12 at a distance of not more than the wavelength of the light 10. Then the light 10, which has been subjected to total reflection in the optical waveguide plate 12, is transmitted through the second displacement-transmitting member 54 and the color filter 40, and it is reflected by the surface of the plate member 32a. Thus, the scattered light 42 is produced, which gives a color corresponding to the color of the color filter 40.

In the display device Di according to the ninth embodiment, it is also unnecessary to switch the light source 100, in the same manner as the display device Dh according to the eighth embodiment. Accordingly, the display device Di can sufficiently deal with the use of an actuator element 14 having a slow response speed. Further, it is possible to obtain high brightness and reduce production cost and electric power consumption.

Next, a display device Dj according to the tenth embodiment will be explained with reference to FIG. 12. Components or parts corresponding to those shown in FIG. 1 are designated by the same reference numerals, duplicate explanation of which will be omitted.

Figure 12:
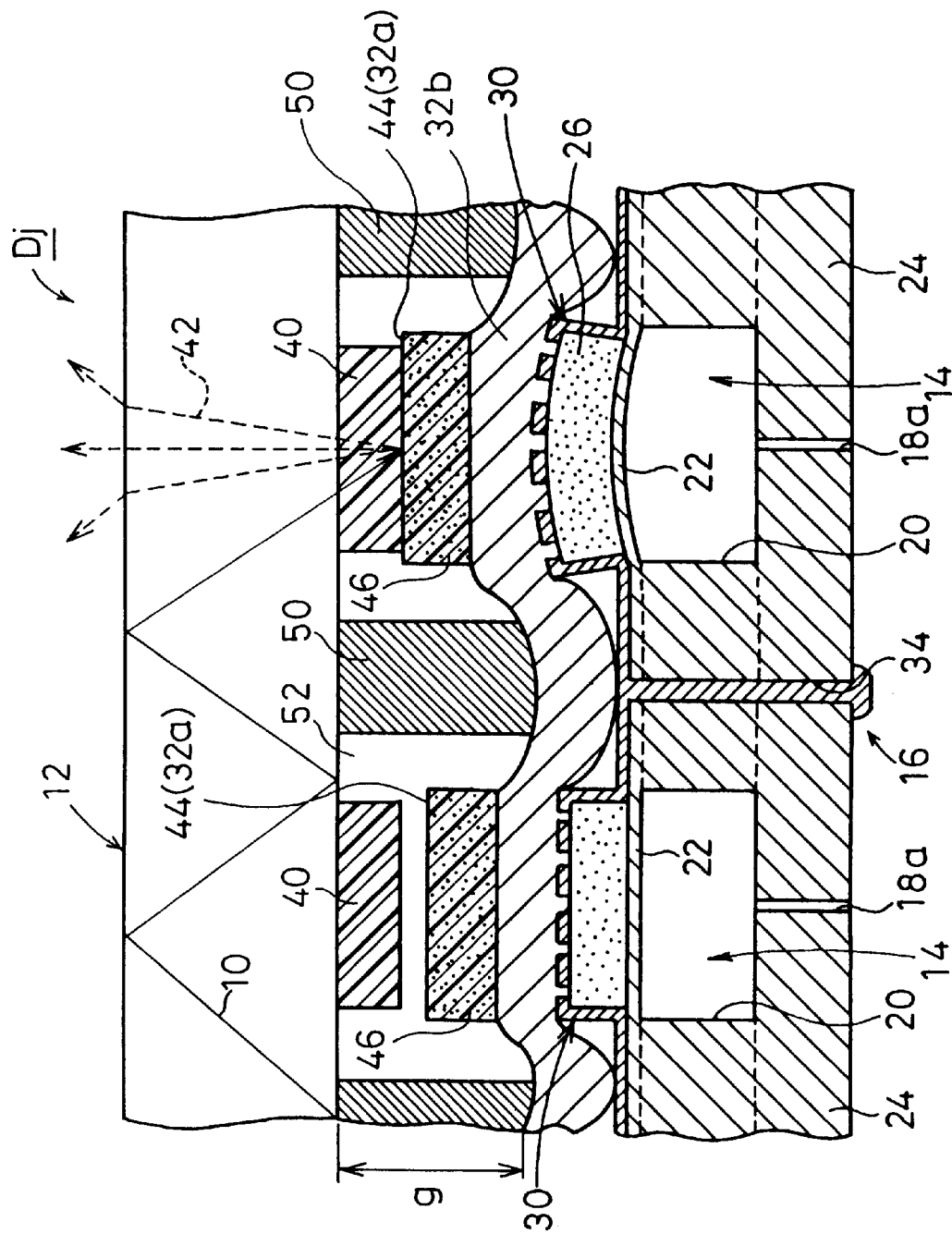
FIG. 12 shows a cross-sectional arrangement illustrating a display device according to the tenth embodiment.

As shown in FIG. 12, the display device Dj according to the tenth embodiment is constructed in approximately the same manner as the display device Da according to the first embodiment (see FIG. 1). However, the former is different from the latter in that a plate member 32a of the displacement-transmitting section 32 is constructed by a colored scattering element 44, and in that a gap g is provided between the optical waveguide plate 12 and the displacement-transmitting member 32b of the displacement-transmitting section 32, and a black matrix layer 50 is formed at positions corresponding to portions (portions at which the color filters 40 are not formed) other than the picture elements, of the gap g. Portions of the gap g corresponding to other than the color filters 40, the colored scattering elements 44, and the black matrix layer 50 are used as air layers 52.

In this embodiment, when a certain actuator element 14 is in the selected state, and the end surface of the colored scattering element 44 contacts with the end surface of the color filter 40 formed on the back surface of the optical waveguide plate 12 at a distance of not more than the wavelength of the light 10, then the light 10, which has been subjected to total reflection in the optical waveguide plate 12, is transmitted through the color filter 40, and it is reflected by the surface of the colored scattering element 44. Thus, the scattered light 42 is produced, which gives a color as a mixture of a color corresponding to the coloring matter 46 of the colored scattering element 44 and a color corresponding to the color filter 40.

In the display device Dj according to the tenth embodiment, it is also unnecessary to switch the light source 100, in the same manner as the display device Da according to the first embodiment. Accordingly, the display device Dj can sufficiently deal with the use of an actuator element 14 having a slow response speed. Further, it is possible to obtain high brightness and reduce production cost and electric power consumption. Especially noteworthy is the fact that the display device Dj gives the color as a mixture of a color corresponding to the color filter 40 and a color corresponding to the coloring matter 46 of the colored scattering element 44. Accordingly, it is possible to perform color correction with ease. The display device Di is advantageous when used to obtain natural colors.

Next, a display device Dk according to the eleventh embodiment will be explained with reference to FIG. 13. Components or parts corresponding to those shown in FIG. 12 are designated by the same reference numerals, duplicate explanation of which will be omitted.

Figure 13:
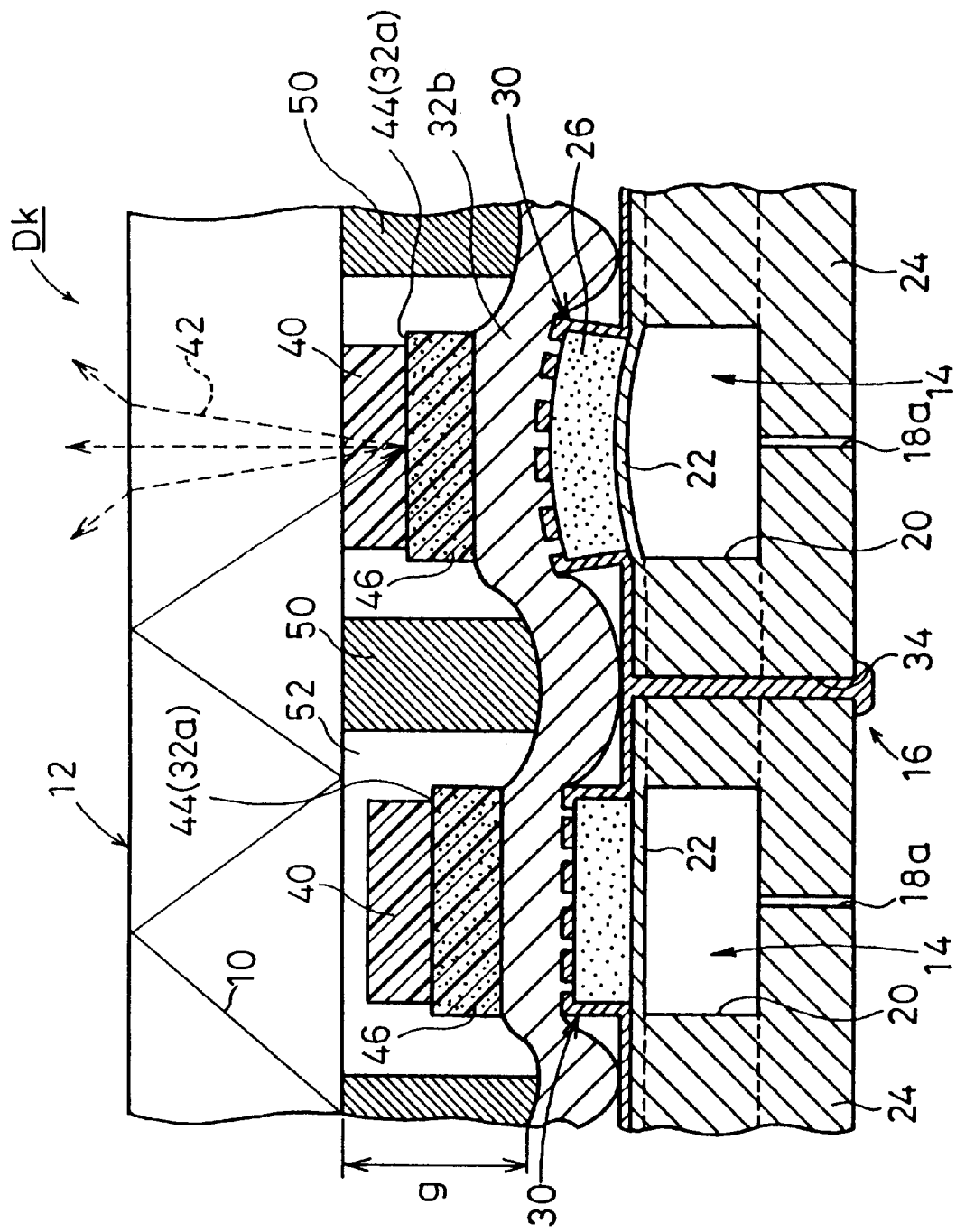
FIG. 13 shows a cross-sectional arrangement illustrating a display device according to the eleventh embodiment.

As shown in FIG. 13, the display device Dk according to the eleventh embodiment is constructed in approximately the same manner as the display device Dj according to the tenth embodiment (see FIG. 12). However, the former is different from the latter in that a color filter 44 is formed on an end surface of the colored scattering element 44 for constructing the plate member 32a of the displacement-transmitting section 32.

In this embodiment, when a certain actuator element 14 is in the selected state, and the end surface of the color filter 40 contacts with the back surface of the optical waveguide plate 12 at a distance of not more than the wavelength of the light 10, then the light 10, which has been subjected to total reflection in the optical waveguide plate 12, is transmitted through the color filter 40, and it is reflected by the surface of the colored scattering element 44. Thus, the scattered light 42 is produced, which gives a color as a mixture of a color corresponding to the coloring matter 46 of the colored scattering element 44 and a color corresponding to the color filter 40.

In the display device Dk according to the eleventh embodiment, it is also unnecessary to switch the light source 100, in the same manner as the display device Dj according to the tenth embodiment. Accordingly, the display device Dk can sufficiently deal with the use of an actuator element 14 having a slow response speed. Further, it is possible to obtain high brightness and reduce production cost and electric power consumption. Also in this embodiment, the display device Dk gives the color as a mixture of a color corresponding to the color filter 40 and a color corresponding to the coloring matter 46 of the colored scattering element 44. Accordingly, it is possible to perform color correction with ease. The display device Dk is advantageous to obtain natural colors.

The display devices Da to Dk according to the first to eleventh embodiments are illustrative of the case in which the displacement-transmitting member 32b of the displacement-transmitting section 32 is formed over the entire surface in the form of film. Alternatively, as in display devices Dm and Dn according to twelfth and thirteenth embodiments shown in FIGS. 14 and 15, the displacement-transmitting sections 32 may be formed in a separated manner as those corresponding to the respective picture element units. In these embodiments, the displacement-transmitting section 32 is preferably constructed to have a structure in which the plate member 32a and the displacement-transmitting member 32 are integrated into one unit. In these embodiments, the color filter 40 and the transparent layer 48 are stacked on the displacement-transmitting section 32.

Accordingly, it is possible to allow the displacement-transmitting section 32 to have a light weight, and it is possible to improve the response speed obtained on each of the actuator elements 14. Further, the display device scarcely suffers influences which would be otherwise exerted by the driving (displacement) of adjoining picture elements. Therefore, it is possible to further increase the contrast.

Figure 14:
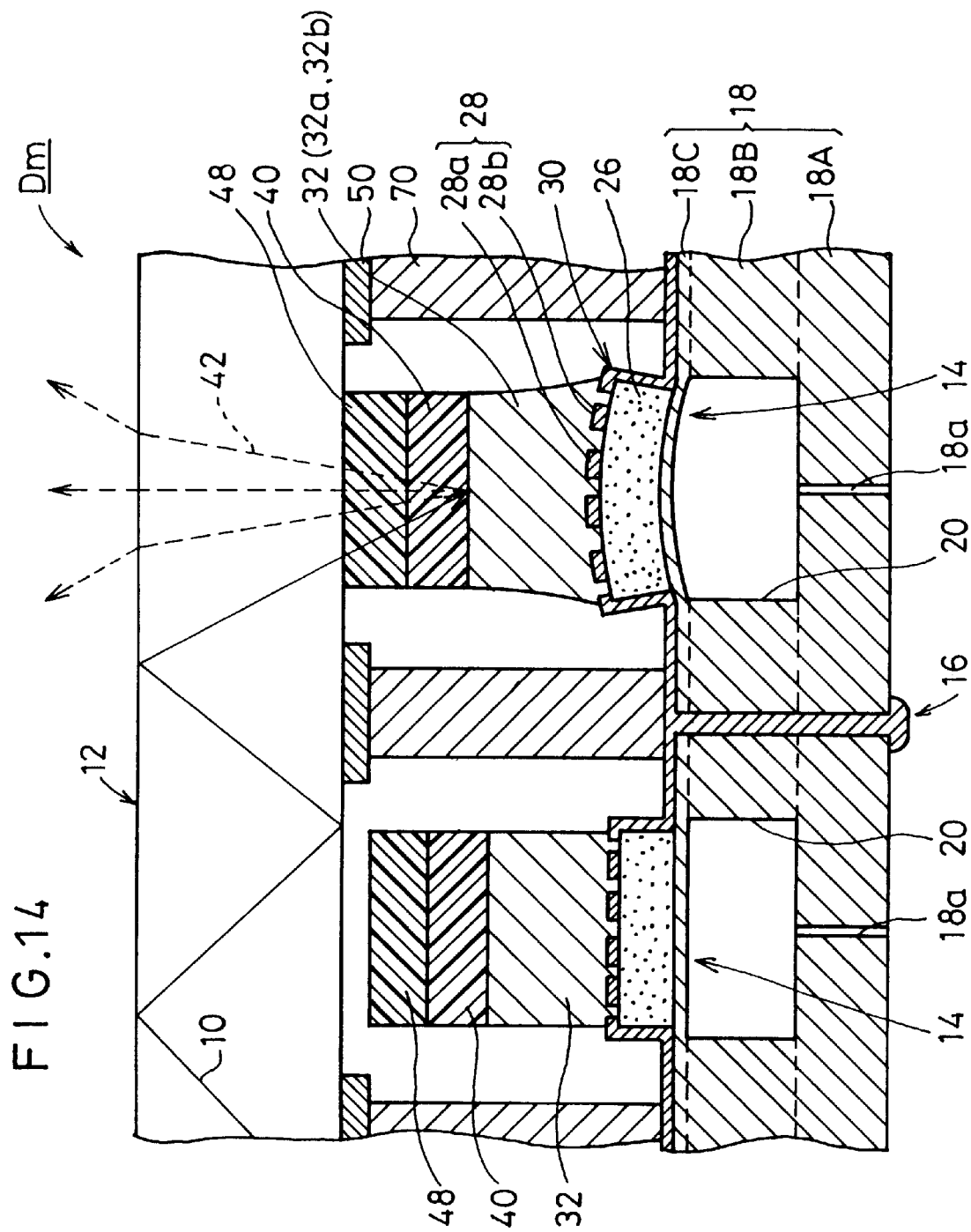
FIG. 14 shows a cross-sectional arrangement illustrating a display device according to the twelfth embodiment.

As shown in FIG. 14, in the display device Dm according to the twelfth embodiment, the optical waveguide plate 12 and the substrate 18 are fixed by using bridges 70. A black matrix layer 50 is provided between forward ends of the brides 70 and the optical waveguide plate 12. Thus, the gap g between the transparent layer 48 as the upper layer and the optical waveguide plate 12 is adjusted by using the black matrix layer 50. Therefore, the display device Dm provides an effect that the gap g of the overall picture elements can be further uniformalized.

In this embodiment, the bridge 70 is preferably composed of a material which does not make deformation on account of heat and pressure. The display device Dm is advantageous in that the gap g can be adjusted with ease when the position of the upper surface of the transparent layer 48 is aligned with the position of the upper surface (the surface to make contact with the black matrix layer 50) of the bridge 70. The method for realizing the alignment includes, for example, a method in which a flat glass surface is used to simultaneously form the transparent layer 48 and the bridge 70, and a method in which the transparent layer 48 and the bride 70 are formed, followed by polishing to perform figuring.

Figure 15:
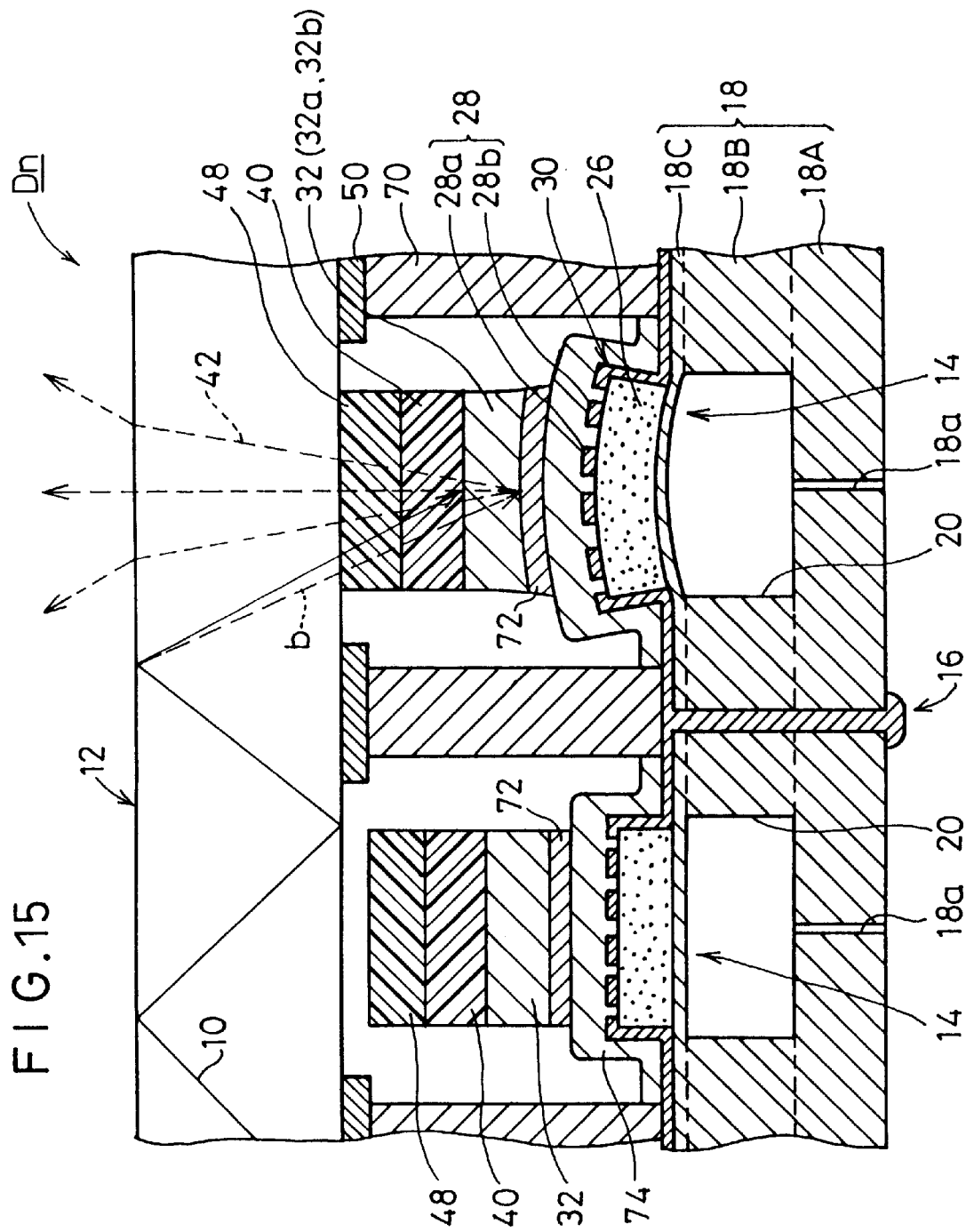
FIG. 15 shows a cross-sectional arrangement illustrating a display device according to the thirteenth embodiment.

On the other hand, as shown in FIG. 15, the display device Dn according to the thirteenth embodiment is characterized in that a light-reflecting layer 72 is formed on the displacement-transmitting section 32 on a side of the substrate 18. As shown in FIG. 15, when the light-reflecting layer 72 is formed just under the displacement-transmitting section 32, if the light-reflecting layer 72 is composed of a conductive layer such as metal, then there is a likelihood to make a short circuit between the pair of electrodes 28a, 28b. Therefore, it is desirable to form an insulative layer 74 between the light-reflecting layer 72 and the main actuator element 30.

Usually, when a part of the light 10 is transmitted through the displacement-transmitting section 32 (for example, if the displacement-transmitting section 32 has a thin layer thickness, or if the displacement-transmitting section 32 is composed of a material in which the content of ceramic powder in an organic resin is low), there is a likelihood that a part of the light 10 introduced via the optical waveguide plate 12 is transmitted toward the substrate 18 through the displacement-transmitting section 32, resulting in decrease in brightness.

However, in the display device Dn according to the thirteenth embodiment as described above, the light-reflecting layer 72 is formed on the displacement-transmitting section 32 on the side of the substrate 18. Accordingly, the light 10 (indicated by the optical path b) transmitted through the displacement-transmitting section 32 can be reflected toward the optical waveguide plate 12. Thus, it is possible to improve brightness.

Especially, when the displacement-transmitting section 32 is transmissive for the light 10, and it is also absorptive for the light 10, then it is more effective for improving brightness to form the light-reflecting layer 72 as in the display device Dn according to the thirteenth embodiment, as compared with a case in which the displacement-transmitting section 32 is made thick. In the display devices Da to Dn according to the first to thirteenth embodiments, the pair of electrodes 28a, 28b are formed in such a form that the row electrode 28a and the column electrode 28b are formed on the surface of the shape-retaining layer 26. Alternatively, as shown in FIG. 16, for example, the row electrode 28a is formed on the lower surface of the shape-retaining layer 26, and the column electrode 28b is formed on the upper surface of the shape-retaining layer 26.

In this embodiment, unlike the display devices Da to Dn according to the first to thirteenth embodiments, the actuator element 14 can be also subjected to bending displacement so that it gives a convex configuration toward the hollow space 20, namely, in the second direction. Accordingly, it is also possible to construct a display device Do concerning the fourteenth embodiment as shown in FIG. 16.

Figure 16:
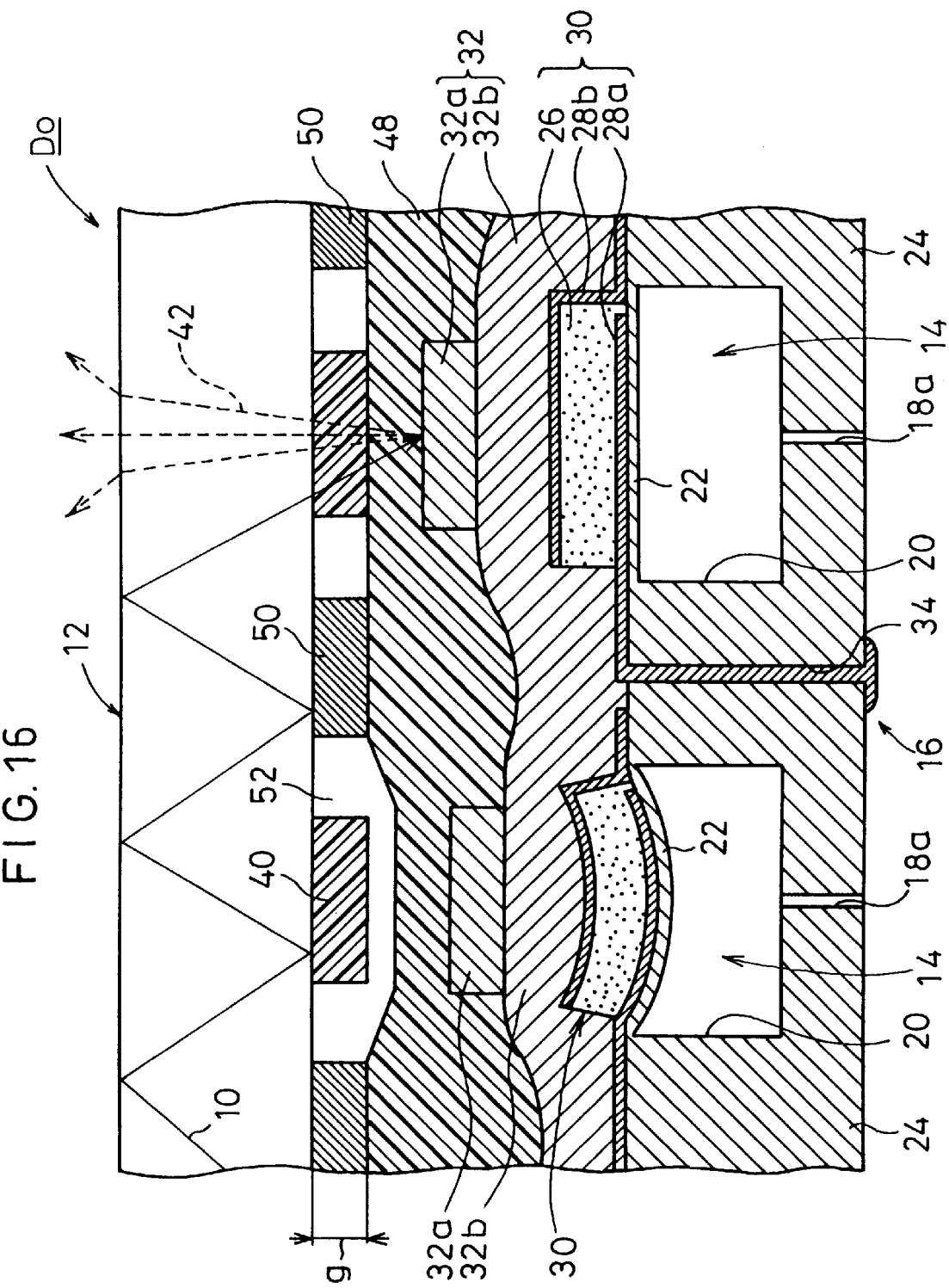
FIG. 16 shows a cross-sectional arrangement illustrating a display device according to the fourteenth embodiment.

As shown in FIG. 16, the display device Do according to the fourteenth embodiment is constructed in the same manner as the display device Dd according to the fourth embodiment (see FIG. 6). However, the driving system of the display device Do is reverse to that of the display device Dd according to the fourth embodiment. That is, in the initial state, the voltage is applied to the respective actuator elements 14 corresponding to all of the picture elements, and all of the actuator elements 14 are subjected to bending displacement in the second direction. In this state, the end surface of the transparent layer 48 is separated from the end surface of the color filter 40. Therefore, all of the picture elements are in the light-off state.

When the voltage application to a certain actuator element 14 is stopped, and the actuator element 14 is in the selected state, the bending displacement of the actuator element 14 in the second direction is reset. Accordingly, the end surface of the transparent layer 48 contacts, at a distance of not more than the wavelength of the light 10, with the end surface of the color filter 40 corresponding to the actuator element 14. As a result, the light 10, which has been subjected to total reflection in the optical waveguide plate 12, is transmitted through the color filter 40 to the surface of the plate member 32a of the displacement-transmitting section 32. Thus, the scattered light 42 is produced, which gives a color corresponding to a color of the color filter 40.

In the display device Do according to the fourteenth embodiment, it is also unnecessary to switch the light source 100, in the same manner as the display device Dd according to the fourth embodiment. Accordingly, the display device Do can sufficiently deal with the use of an actuator element 14 having a slow response speed. Further, it is possible to obtain high brightness and reduce production cost and electric power consumption.

When the light 10, which is radiated from the light source 100 to be introduced into the optical waveguide plate 12, is visible light, there is a likelihood that scattered light may be produced due to defects (for example, flaws and foreign matters) in the optical waveguide plate 12, sometimes resulting in deterioration of contrast.

In the display devices Da to Do according to the first to fourteenth embodiments, the image is displayed by controlling the displacement action of each of the actuator elements 14 in the direction to make contact or separation with respect to the optical waveguide plate 12 so that the scattered light (leakage light) 42 is controlled at the predetermined position of the optical waveguide plate 12. However, if the contact of the picture element is incomplete, there is a likelihood that the display brightness is decreased. In order to solve this problem, it is conceived that the displacement-transmitting section 32 is constructed by using a flexible material. However, another problem arises in that such a system is disadvantageous in response performance.

Figure 17:
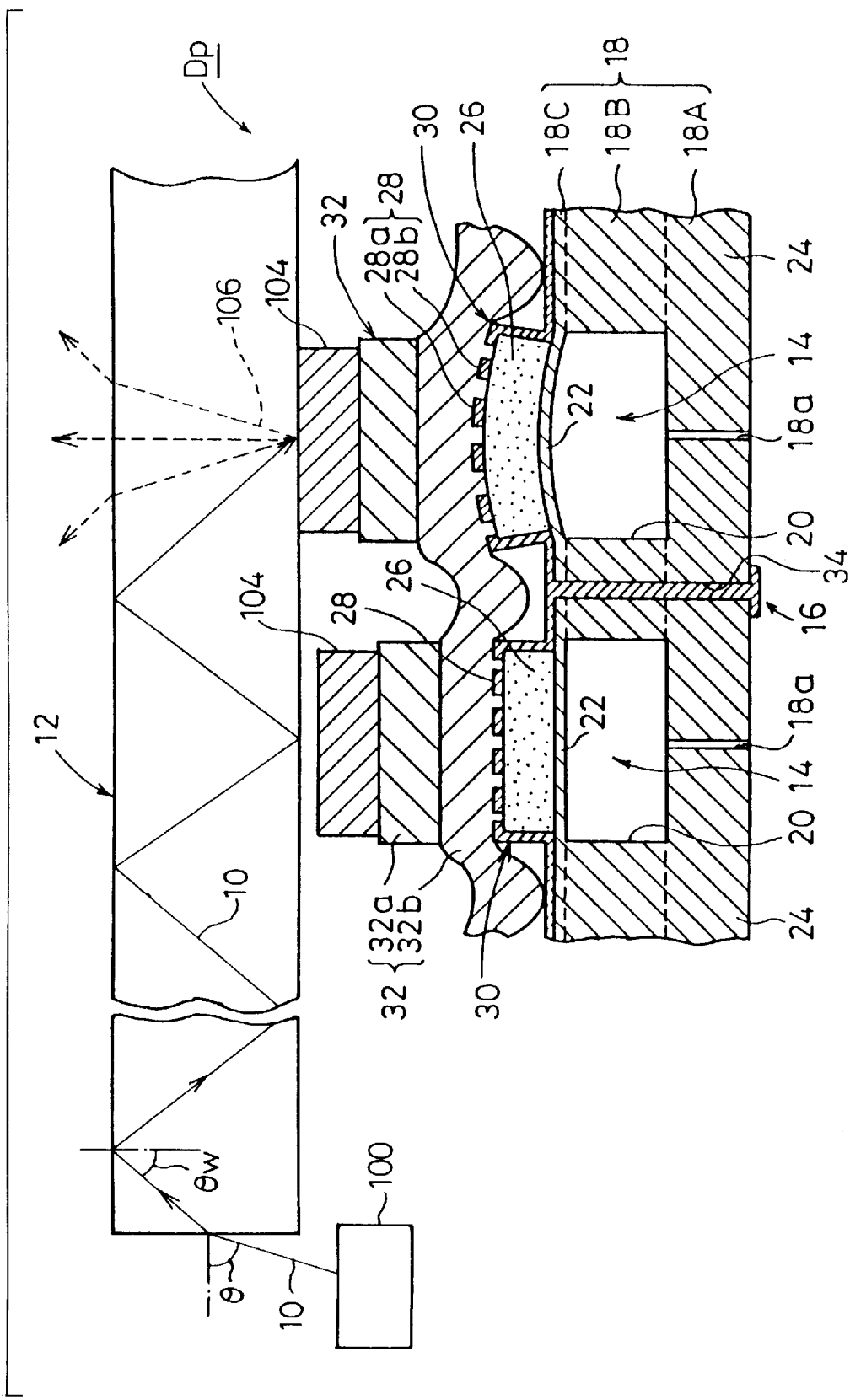
FIG. 17 shows a cross-sectional arrangement illustrating a display device according to the fifteenth embodiment.
Figure 18:
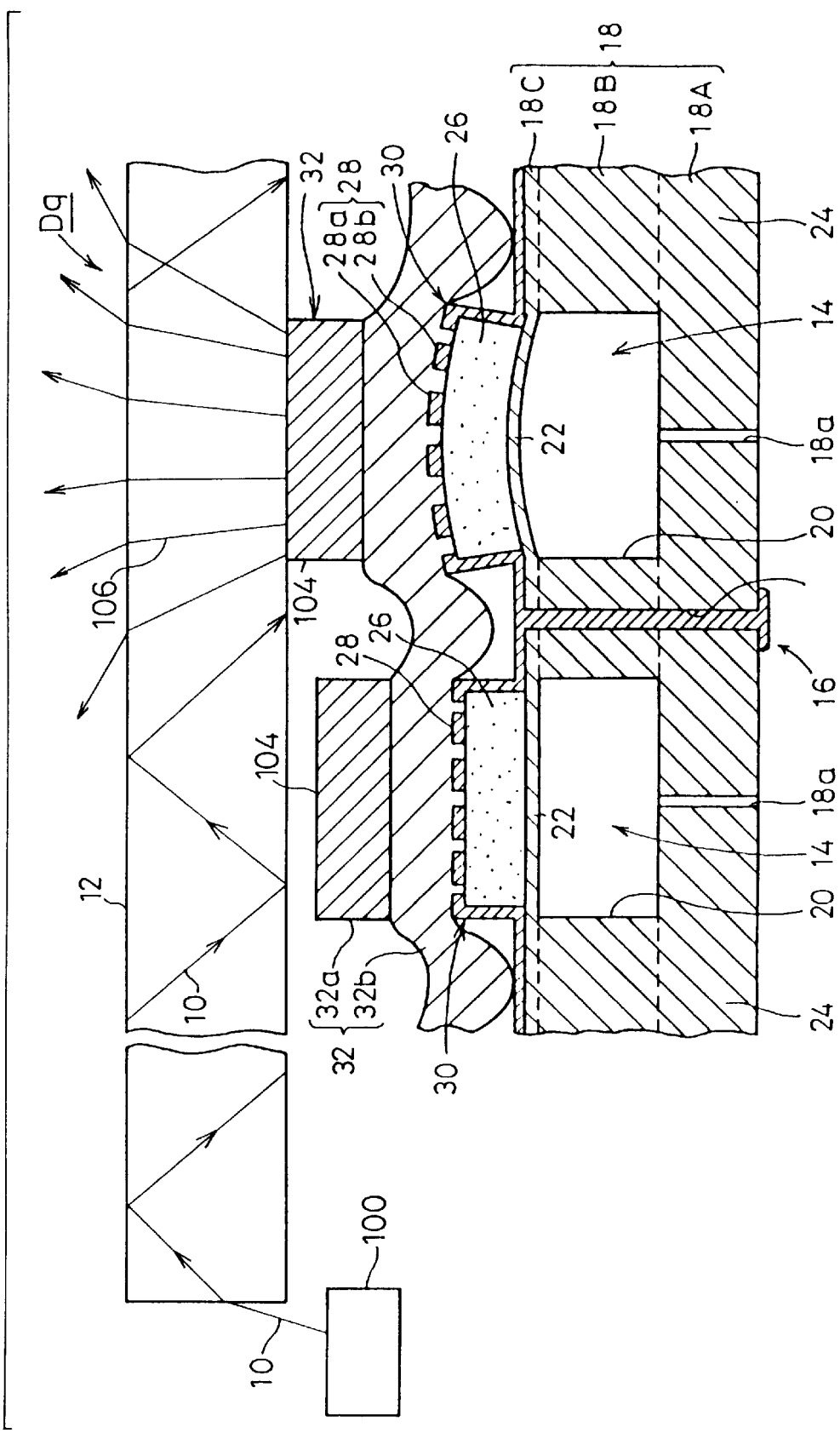
FIG. 18 shows a cross-sectional arrangement illustrating a display device according to the sixteenth embodiment.

As shown in FIGS. 17 and 18, in the following display devices Dp and Dq according to the fifteenth and sixteenth embodiments, invisible light is used as the light 10 which is radiated from the light source 100 to be introduced into the optical waveguide plate 12. The picture element is formed with a fluorescent element (fluorescent layer 104 in the embodiments shown in FIGS. 17 and 18) which is excited by the invisible light 10 to emit predetermined visible light 106.

The display device Dp according to the fifteenth embodiment shown in FIG. 17 represents a case in which the fluorescent layer 104 is formed on the upper surface of the plate member 32a of the displacement-transmitting section 32. The display device Dq according to the sixteenth embodiment shown in FIG. 18 represents a case in which the fluorescent layer 104 is formed in place of the plate member 32a. Those usable as the invisible light 10 include ultraviolet light and infrared light, however, any of them may be used. The arrangement of the other components or parts is the same as that of the display device Da according to the first embodiment shown in FIG. 1, detailed explanation of which will be omitted.

Specified examples of the display devices Dp and Dq according to the fifteenth and sixteenth embodiments will be described. For example, an infrared light source can be used as the light source 100, and a fluorescent element based on infrared light excitation can be used as the light-emitting element (the fluorescent layer 104 in the embodiments shown in FIGS. 17 and 18) formed on the picture element. In such an arrangement, there is no special limitation for the infrared light-excited fluorescent element. Those usable as the infrared light-excited fluorescent element include, for example, those based on the use of the infrared stimulation effect, the quantum counting function, and the multi-stage energy transfer.

In the display devices Dp and Dq according to the fifteenth and sixteenth embodiments, a stimulus fluorescent element can be used while using the infrared light and the stimulation exciting light source in combination. When color display is performed, three kinds of fluorescent materials, which exhibit red, green, and blue light emissions as three primary colors of light respectively, can be used to arrange them in a two-dimensional pattern so that an image is formed.

The light source 100 is not specifically limited, provided that it includes the light 10 having a wavelength necessary to excite the fluorescent element, and it has an energy density sufficient for excitation. Those preferably used for the infrared exciting fluorescent element include, for example, infrared lasers and halogen lamps.

As described above, in the display devices Dp and Dq according to the fifteenth and sixteenth embodiments, the invisible light 10 is used as the light 10 to be introduced into the optical waveguide plate 12. Accordingly, visible light emission, which would be otherwise caused by those other than light emission brought about by the picture element, completely disappears in the optical waveguide plate 12. Therefore, the display devices Dp and Dq are advantageous to improve the contrast.

Further, the depth dp of the effective evanescent region 102 (see FIG. 3) can be made large by adjusting the energy density, the wavelength, and the angle of incidence of the invisible light 10 radiated from the light source 100. Therefore, it is possible to perform display having large brightness even when the contact of the picture element is incomplete.

In these embodiments, the design in which the contact property of the picture element is considered (the design based on the use of flexible materials) can be improved into a design in which the rigidity is high and the importance is attached to response performance. Such a design leads to realization of a high speed for row scanning, making it extremely easy to realize high quality image display.

As for the modulation system for the gradation control, it is possible to apply all of the voltage modulation system and the time modulation system described above. Especially, when the voltage modulation system is used, the depth dp of the effective evanescent region 102 is increased, which is advantageous to achieve multi-stage gradation.

Especially, as shown in FIG. 17, for example, it is assumed that the angle of incidence of the invisible light 10 from the light source 100 to the side surface of the optical waveguide plate 12 is θ, and the angle of incidence with respect to air obtained when the invisible light 10 arrives at the surface of the optical waveguide plate 12 is θW. The advantage is increased as the energy density is increased, as the wavelength is increased, and as the angle of incidence θ is increased (provided that it is an essential condition that the angle of incidence θW is larger than the critical angle).

EXAMPLE 1

At first, color resist solutions of the pigment dispersion type (red, green, and blue; produced by Hitachi Chemical) were prepared. One of surfaces of an optical waveguide plate 12 made of an acrylic material (length: 210 mm×width: 297 mm×thickness: 10 mm) was coated with the color resist solution by means of, for example, spin coating, followed by drying. Patterning was performed by means of etching based on the photolithography technique to form color filters 40. Since the color filters 40 were prepared for three primary colors, the process described above was repeated three times to form the color filters 40 of the three colors.

After that, a display device was produced, as having the same arrangement as that of the display device Da according to the first embodiment shown in FIG. 1. When the produced display device was operated, it was possible to emit light of red, green, and blue colors which were similar to the NTSC standard colors of the CIE chromaticity system. At that time, the brightness obtained upon no emission (light-off) was as follows: red=3.2 (nt), green=10.1 (nt), and blue=2.8 (nt).

Figure 19:
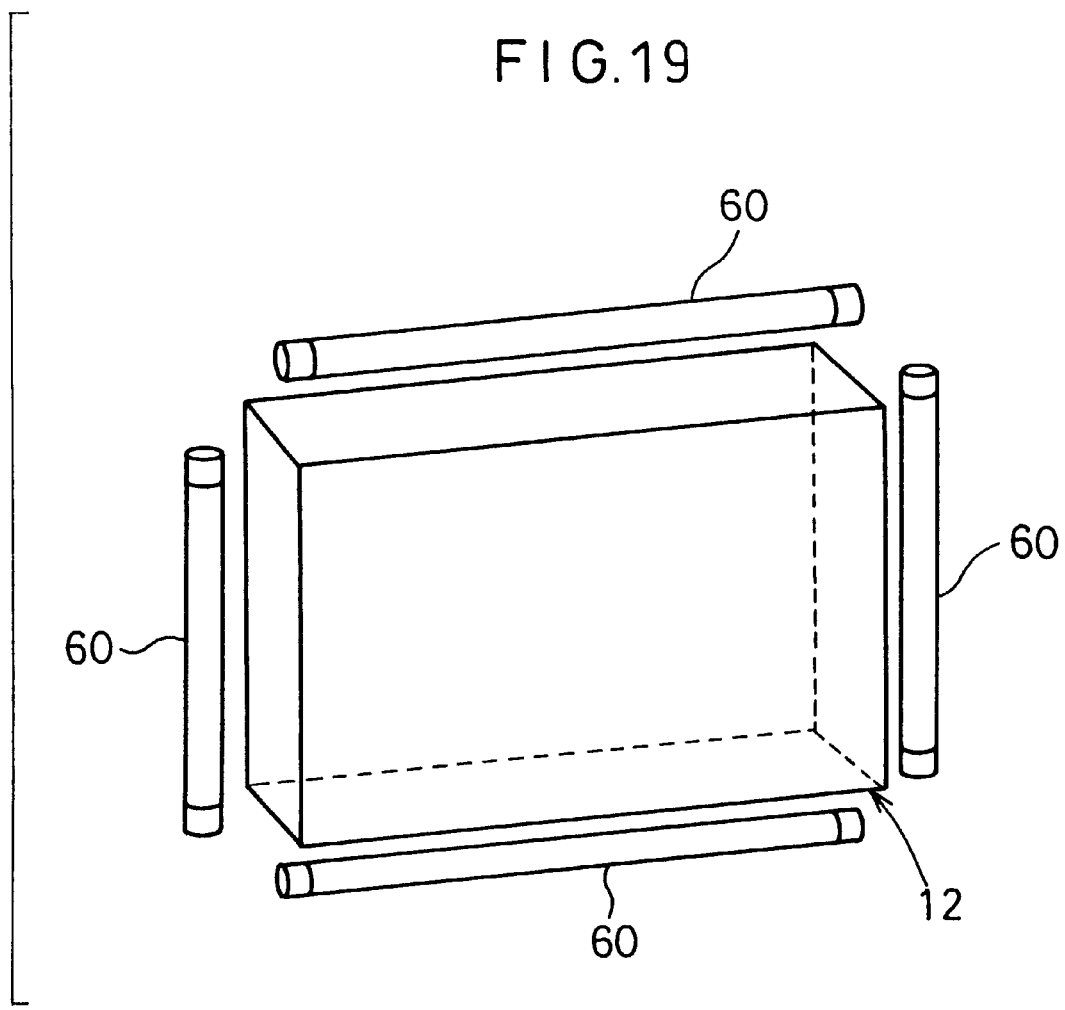
FIG. 19 illustrates an arrangement of light sources concerning Examples 1 to 3.

Light sources were arranged as shown in FIG. 19. That is, a cold cathode tube 60 (white light, surface brightness=10, 000 [nt], no reflector) was arranged on each of four sides of the optical waveguide plate 12.

EXAMPLE 2

Oil dyes (red, green, and blue), an ethyl cellulose resin, and an organic solvent were mixed and kneaded to prepare a color paste having a light-transmitting property. After that, the color paste was printed on the displacement-transmitting section 32 by using the screen printing method to form the color filter 40 on the plate member 32a of the displacement-transmitting section 32.

After that, a display device was produced, as having the same arrangement as that of the display device Db according to the second embodiment shown in FIG. 4. When the produced display device was operated, it was possible to emit light of red, green, and blue colors which were similar to the NTSC standard colors of the CIE chromaticity system. At that time, the brightness obtained upon no emission (light-off) was 1.2 (nt). Light sources were arranged in the same manner as arranged in Example 1.

EXAMPLE 3

Pigments (red, green, and blue), an ethyl cellulose resin, and an organic solvent were mixed and kneaded to prepare color pastes having no light-transmitting property. After that, each of the color pastes was printed on the displacement-transmitting section 32 by using the screen printing method to form the colored scattering element 44 on the plate member 32a of the displacement-transmitting section 32.

After that, a display device was produced, as having the same arrangement as that of the display device Dc according to the third embodiment shown in FIG. 5. When the produced display device was operated, it was possible to emit light of red, green, and blue colors which were similar to the NTSC standard colors of the CIE chromaticity system. At that time, the brightness obtained upon no emission (light-off) was 1.2 (nt). Light sources were arranged in the same manner as arranged in Example 1.

It is a matter of course that the display device according to this invention is not limited to the embodiments described above, which may adopt other various forms without deviating from the gist or essential characteristics of this invention.

As described above, the display device according to the present invention comprises the displacement-transmitting section for transmitting the displacement action of the actuator element to the optical waveguide plate, in which the colored layer is arranged between the displacement-transmitting section and the optical waveguide plate.

Accordingly, it is possible to obtain the effect that it is unnecessary to switch the light source, the display device can sufficiently deal with the use of an actuator element having a slow response speed, and it is possible to obtain high brightness and reduce production cost and electric power consumption.

What is claimed is:

1. A display device comprising an optical waveguide plate for introducing light thereinto, and a driving section provided opposingly to one plate surface of said optical waveguide plate and including a number of actuator elements arranged corresponding to a large number of picture elements, for displaying, on said optical waveguide plate, a picture image corresponding to an image signal by controlling leakage light at a predetermined portion of said optical waveguide plate by controlling displacement action of each of said actuator elements in a direction to make contact or separation with respect to said optical waveguide plate in accordance with an attribute of said image signal to be inputted; said display device further comprising:

a displacement-transmitting section for transmitting said displacement action of said actuator element to said optical waveguide plate; and a colored layer disposed between said displacement-transmitting section and said optical waveguide plate.

2. The display device according to claim 1, wherein said colored layer is a color filter.

3. The display device according to claim 1, wherein said colored layer is a colored scattering element.

4. The display device according to claim 1, wherein said actuator element comprises an operating section including a shape-retaining layer and at least a pair of electrodes formed on said shape-retaining layer, a vibrating section for supporting said operating section, and a fixed section for supporting said vibrating section in a vibrating manner.

5. The display device according to claim 1, wherein said colored layer is formed at a position corresponding to said actuator element, on a surface of said optical waveguide plate opposing to said driving section.

6. The display device according to claim 5, further comprising:

said displacement-transmitting section for transmitting said displacement action of said actuator element to said optical waveguide plate, wherein:

a transparent layer intervenes between said displacement-transmitting section and said colored layer.

7. The display device according to claim 6, wherein an end surface of said transparent layer is displaced in a direction to make contact or separation with respect to said colored layer in accordance with said displacement action of said actuator element.

8. The display device according to claim 6, wherein an end surface of said displacement-transmitting section is displaced in a direction to make contact or separation with respect to an end surface of said transparent layer in accordance with said displacement action of said actuator element.

9. The display device according to claim 1, wherein said colored layer is formed at a position corresponding to said actuator element, on an end surface of said displacement-transmitting section.

10. The display device according to claim 9, wherein a second displacement-transmitting section is disposed on a surface including said colored layer.

11. A display device comprising an optical waveguide plate for introducing light thereinto, and a driving section provided opposingly to one plate surface of said optical waveguide plate and including a number of actuator elements arranged corresponding to a large number of picture elements, for displaying, on said optical waveguide plate, a picture image corresponding to an image signal by controlling leakage light at a predetermined portion of said optical waveguide plate by controlling displacement action of each of said actuator elements in a direction to make contact or separation with respect to said optical waveguide plate in accordance with an attribute of said image signal to be inputted; said display device further comprising:

a displacement-transmitting section for transmitting said displacement action of said actuator element to said optical waveguide plate, wherein:

a part of said displacement-transmitting section is also used as a colored layer.

12. The display device according to claim 11, wherein said colored layer is a color filter.

13. The display device according to claim 11, wherein said colored layer is a colored scattering element.

14. The display device according to claim 11, wherein said actuator element comprises an operating section including a shape-retaining layer and at least a pair of electrodes formed on said shape-retaining layer, a vibrating section for supporting said operating section, and a fixed section for supporting said vibrating section in a vibrating manner.

15. The display device according to claim 11, wherein a transparent layer intervenes between said optical waveguide plate and said colored layer.

16. The display device according to claim 11, wherein a second displacement-transmitting section is disposed on a surface including said displacement-transmitting section which is also used as said colored layer.

17. The display device according to claim 11, wherein a second colored layer is formed at a position corresponding to said actuator element, on a surface of said optical waveguide plate opposing to said driving section.

18. The display device according to claim 17, wherein when a part of said displacement-transmitting section is a colored scattering element, said second colored layer is a color filter.

19. The display device according to claim 11, wherein a second colored layer is formed at a position corresponding to said actuator element, on an end surface of said displacement-transmitting section which is also used as said colored layer.

* * * * *